(12) United States Patent
Woo et al.

(10) Patent No.: US 10,768,459 B2
(45) Date of Patent: Sep. 8, 2020

(54) LIQUID CRYSTAL DISPLAY DEVICE

(71) Applicant: LG Display Co., Ltd., Seoul (KR)

(72) Inventors: Yongtaek Woo, Paju-si (KR); Yeongho Kim, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 16/222,494

(22) Filed: Dec. 17, 2018

(65) Prior Publication Data

US 2019/0196251 A1 Jun. 27, 2019

(30) Foreign Application Priority Data

Dec. 27, 2017 (KR) .................. 10-2017-0181387

(51) Int. Cl.
*G02F 1/1333* (2006.01)
*F21V 8/00* (2006.01)

(52) U.S. Cl.
CPC ...... *G02F 1/133308* (2013.01); *G02B 6/0088* (2013.01); *G02B 6/0093* (2013.01); *G02F 2001/133314* (2013.01); *G02F 2001/133317* (2013.01); *G02F 2001/133322* (2013.01); *G02F 2201/46* (2013.01); *G02F 2201/465* (2013.01); *G02F 2201/503* (2013.01)

(58) Field of Classification Search
CPC ......... G02F 1/133308; G02F 2201/465; G02F 2201/46; G02F 2201/503; G02F 2001/133322; G02F 2001/133317; G02F 2001/133314; G02B 6/0093

See application file for complete search history.

(56) References Cited

U.S. PATENT DOCUMENTS

| | | | | |
|---|---|---|---|---|
| 2006/0290836 A1* | 12/2006 | Chang | .................. | G02B 6/0088 349/58 |
| 2012/0268686 A1* | 10/2012 | Lee | .................... | G02F 1/133308 349/59 |
| 2014/0176852 A1 | 6/2014 | Ha | | |
| 2015/0181656 A1* | 6/2015 | Bang | ................. | G02F 1/133308 313/512 |
| 2016/0349568 A1 | 12/2016 | Oh | | |
| 2017/0192163 A1 | 7/2017 | Oh | | |

FOREIGN PATENT DOCUMENTS

| | | |
|---|---|---|
| CN | 205787467 U | 12/2016 |
| KR | 10-1285542 B1 | 7/2013 |
| KR | 10-2014-0076290 A | 6/2014 |
| KR | 10-2017-001440 A | 2/2017 |
| TW | 201403184 A | 1/2014 |

* cited by examiner

*Primary Examiner* — Jessica M Merlin
(74) *Attorney, Agent, or Firm* — Seed Intellectual Property Law Group LLP

(57) ABSTRACT

A liquid crystal display device is provided. The liquid crystal display device includes a liquid crystal panel, a cover bottom, a rear cover, and a guide panel. The liquid crystal panel displays an image. The cover bottom accommodates a light source configured to provide light to the liquid crystal panel. The rear cover accommodates the cover bottom. The guide panel is positioned on the cover bottom to support the liquid crystal panel. Each of the guide panel and the cover bottom includes a hook which protrudes from a surface so as to be fitted to a latching portion of the rear cover.

20 Claims, 15 Drawing Sheets

LIQUID CRYSTAL DISPLAY DEVICE

CROSS-REFERENCE TO RELATED APPLICATION(S)

This application claims the benefit of Korean Patent Application No. 10-2017-0181387, filed on Dec. 27, 2017, which is incorporated herein by reference for all purposes as if fully set forth herein.

BACKGROUND

Technical Field

The present disclosure relates to a liquid crystal display device.

Description of the Related Art

With development of information technologies, the market of displays used as a medium that connects a user and information is growing. Accordingly, demands for Flat Panel Display (FPD), such as Liquid Crystal Display (LCD), Organic Light Emitting Diode Display (OLED), and Plasma Display Panel (PD) are increasing. Among them, the LCD which can realize high resolution and can be manufactured both in a small size and in a large size are most widely used.

The LCD includes a liquid crystal panel and a backlight unit. The liquid crystal panel includes a liquid crystal layer, and liquid crystal layer is formed between a transistor substrate, on which a thin film transistor, a storage capacitor, a pixel electrode, etc., are formed, and a color filter substrate on which a color filter, a black matrix, etc., are formed.

The backlight unit includes: a Light Emitting Diode (LED) substrate on which an LED and an LED driver for driving the LED are formed; a light guide plate which converts light emitted from the LED into a surface light source; a reflective plate which reflects light at the bottom of the light guide plate; and optical sheets which collects and diffuses light emitted from the light guide plate. The backlight unit includes a cover bottom which accommodates the LED substrate, the light guide plate, the reflective plate, and the optical sheets.

The liquid crystal panel and the backlight unit are assembled by mechanisms, such as a rear cover and a guide panel, to be manufactured into a liquid crystal panel module. The backlight unit is accommodated in the rear cover, and the liquid crystal panel sits on the guide panel which is covered to the rear cover. However, the existing mechanism which has been proposed may be difficult to be coupled to each other or may damage to the panel. There is a need of a solution of these problems.

BRIEF SUMMARY

The present disclosure provides in one or more embodiments a liquid crystal display device including a liquid crystal panel, a cover bottom, a rear cover, and a guide panel. The liquid crystal panel displays an image. The cover bottom accommodates a light source configured to provide light to the liquid crystal panel. The rear cover accommodates the cover bottom. The guide panel is positioned on the cover bottom to support the liquid crystal panel. Each of the guide panel and the cover bottom includes a hook which protrudes from respective surfaces of the guide panel and the cover bottom, and the hooks are fitted into corresponding latching portions of the rear cover to couple the guide panel and the cover bottom to the rear cover.

In another embodiment, the present disclosure provides a liquid crystal display device including a liquid crystal panel, a cover bottom, a rear cover, and a guide panel. The liquid crystal panel displays an image. The cover bottom accommodates a light source configured to provide light to the liquid crystal panel. The rear cover accommodates the cover bottom. The guide panel is positioned on the cover bottom to support the liquid crystal panel. The cover bottom includes a cover bottom hook which protrudes from a surface of the cover bottom and is fitted to an adjacent latching portion of one of the rear cover or the guide panel. The cover bottom hook protrudes from a bottom side wall of the cover bottom, and includes a protruding portion which protrudes laterally outward from the bottom side wall, and an inclined portion which protrudes outwardly at an incline from the bottom side wall. The inclined portion of the cover bottom hook faces the cover base of the rear cover.

BRIEF DESCRIPTION OF THE SEVERAL VIEWS OF THE DRAWINGS

The accompany drawings, which are included to provide a further understanding of the disclosure and are incorporated on and constitute a part of this specification illustrate embodiments of the disclosure and together with the description serve to explain the principles of the disclosure.

DETAILED DESCRIPTION

Reference will now be made in detail to embodiments of the disclosure examples of which are illustrated in the accompanying drawings.

In the following description, a liquid crystal display device may be implemented in a twisted nematic (TN) mode, a vertical alignment (VA) mode, an in-plane switching (IPS) mode, a fringe field switching (FFS) mode, or an electrically controlled birefringence (ECB) mode depending on configuration of a pixel electrode and a common electrode of a liquid crystal panel.

In the following description, a backlight unit and a liquid crystal display device using the same may be used in diverse fields, for example, a mobile computer such as a laptop, office automated equipment, an audio/video device, an outdoor/indoor advertisement display, a vehicle display, etc.

Figure 1:
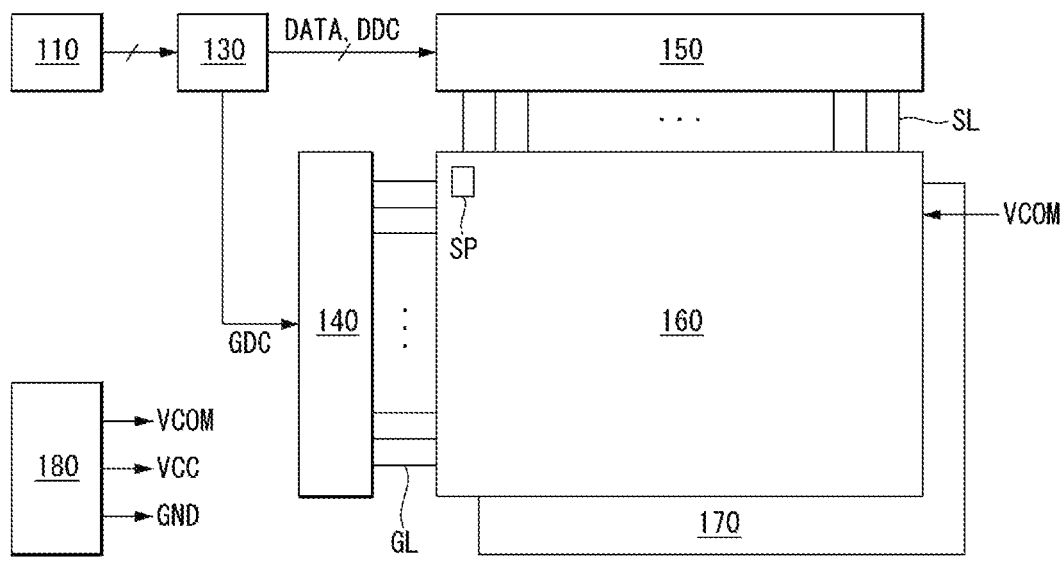
FIG. 1 is a block diagram schematically illustrating a liquid crystal display device according to a first embodiment of the present disclosure.
Figure 2:
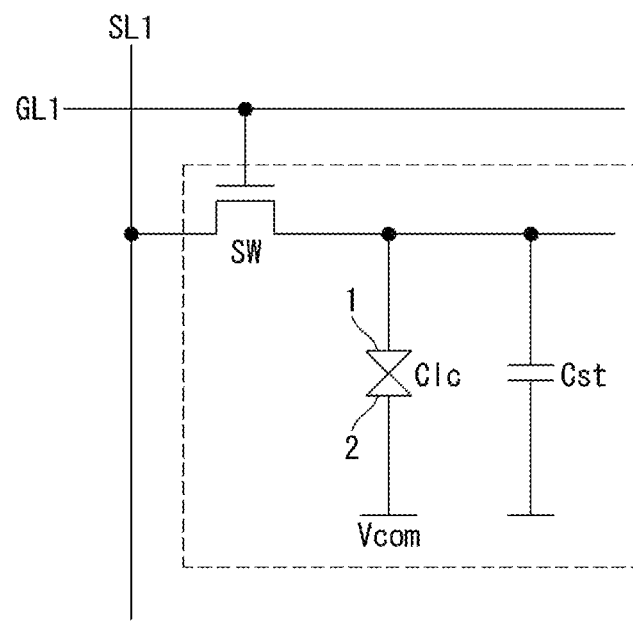
FIG. 2 is a circuit diagram schematically illustrating a subpixel shown in FIG. 1.

FIG. 1 is a block diagram schematically illustrating a liquid crystal display device according to a first embodiment of the present disclosure, and FIG. 2 is a circuit diagram schematically illustrating a subpixel shown in FIG. 1.

As illustrated in FIGS. 1 and 2, a liquid crystal display device includes an image supply 110, a timing controller 130, a gate driver 140, a data driver 150, a liquid crystal panel 160, a power supply 180, and a backlight unit 170.

The image supply 110 processes a data signal and outputs the data signal together with a vertical synchronization signal, a horizontal synchronization signal, a data enable signal, and a clock signal. The image supply 110 supplies the vertical synchronization signal, the horizontal synchronization signal, the data enable signal, the clock signal, and the data signal to the timing controller 130 through a Transition Minimized differential Signaling (TMDS) interface.

The timing controller 130 outputs a gate timing control signal GDC for controlling an operation timing of the gate driver 140, and a data timing control signal DDC for controlling an operation timing of the data driver 150. In addition to the data timing control signal DDC, the timing controller 130 supplies a data signal DATA, supplied from the image supply 110, to the data driver 150.

The gate driver 140 outputs a gate signal in response to the gate timing control signal GDC supplied from the timing controller 130. The gate driver 140 supplies a gate signal to subpixels SP, included in the liquid crystal panel 160, through gate lines GL. The gate driver 140 may be in the form of an Integrated Circuit (IC) or may be formed in the liquid crystal panel 160 in a Gate In Panel (GIP) method.

In response to the data timing control signal DDC supplied from the timing controller 130, the data driver 150 samples and latches a data signal DATA in a digital format, converts the digital signal DATA into a gamma reference voltage, and, in turn, outputs a data voltage in an analog format. The data driver 140 may output a data voltage in each frame period by inverting a polarity of the data voltage. The data driver 140 supplies a data voltage (or a data signal) to the subpixels, included in the liquid crystal panel 160, through data lines SL. The data driver 150 is formed in the form of an IC.

The power supply 180 generates and outputs a high potential voltage VCC, a low potential voltage GND, and a common voltage VCOM. The high potential voltage VCC and the low potential voltage GND are supplied to one or more of the timing controller 130, the gate driver 140, and the data driver 150. The common voltage VCOM is supplied to the liquid crystal panel 160. The common voltage VCOM is supplied to the subpixels SP through a common voltage line Vcom of the liquid crystal panel 160.

The liquid crystal panel 160 displays an image in response to a gate signal supplied from the gate driver 140 and a data voltage supplied from the data driver 150. The liquid crystal panel 160 includes subpixels SP that control light provided using the backlight unit 170.

Each subpixel includes a switching transistor SW, a storage capacitor Cst, and a liquid crystal layer Clc. The switching transistor SW includes a gate electrode connected to a gate line GL1, and a source electrode connected to a data line SL1. The storage capacitor Cst includes one end connected to a drain electrode of the switching transistor SW, and the other end connected to the common voltage line Vcom. The liquid crystal layer Clc is formed between a pixel electrode 1 connected to the drain electrode of the switching transistor SW and a common electrode 2 connected to the common voltage line Vcom.

The backlight unit 170 provides light to the liquid crystal panel 160 using a light source which emits light. The backlight unit 170 includes a light emitting diode (hereinafter, referred to as a Light Emitting Diode (LED)), an LED driver which drives the LED, an LED substrate on which the LED is mounted, a light guide plate which converts light emitted from the LED into a surface light source, a reflective sheet which reflects light in the bottom of the light guide plate, optical sheets which collects and diffuses light emitted from the light guide plate, etc. The backlight unit 170 may vary a turn-on time and a turn-off time in response to a pulse width modulation signal output from the LED driver.

The above-described liquid crystal display device is being developed as including a white subpixel in addition to a red subpixel, a green subpixel, and a blue subpixel (hereinafter, referred to as a RGBW-type liquid crystal display device). The RGBW-type liquid crystal display device is able to increase brightness of a liquid crystal panel using white subpixels the backlight unit 170, and thus it may reduce brightness of the backlight unit 170, thereby reducing power consumption.

Figure 3:
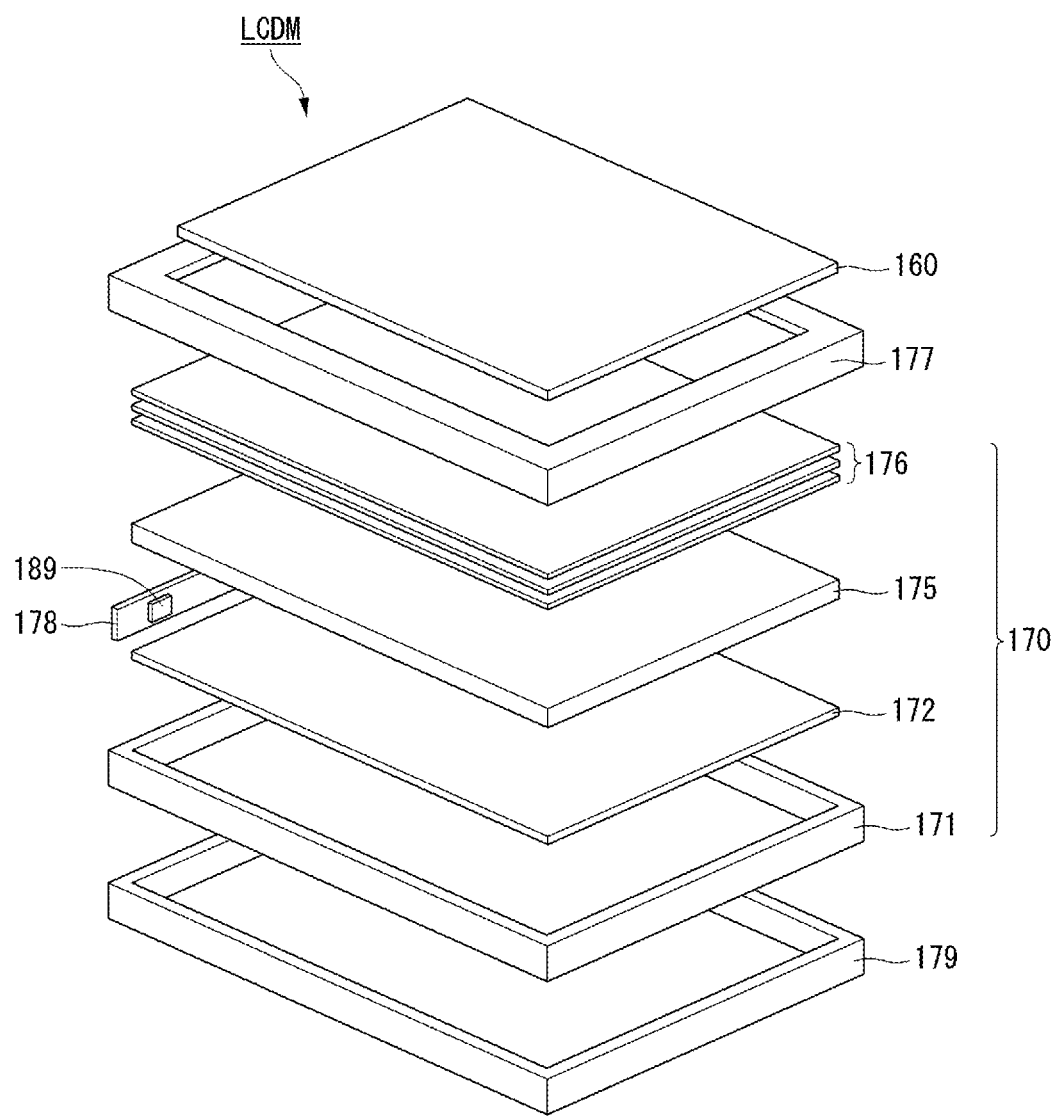
FIG. 3 is an exploded perspective view of a liquid crystal panel module according to the first embodiment of the present disclosure.
Figure 4:
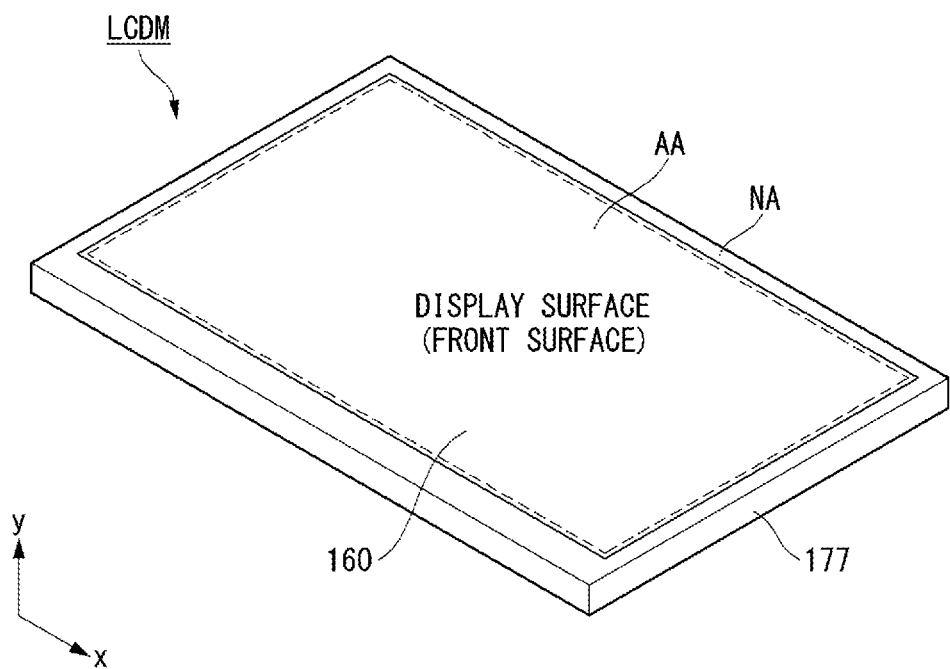
FIGS. 4 and 5 are diagrams illustrating the front and rear surfaces of a liquid crystal panel module assembly according to the first embodiment of the present disclosure.
Figure 5:
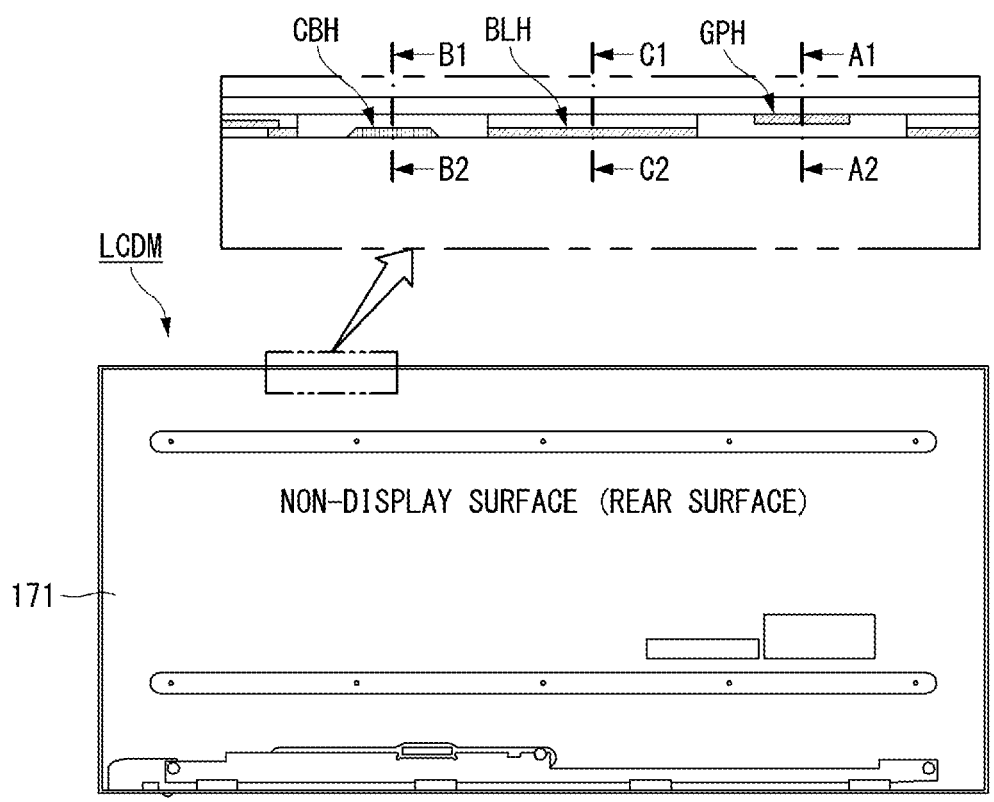

FIG. 3 is an exploded perspective view of a liquid crystal panel module according to the first embodiment of the present disclosure, and FIGS. 4 and 5 are diagrams illustrating the front and rear surfaces of a liquid crystal panel module assembly according to the first embodiment of the present disclosure.

As illustrated in FIG. 3, a liquid crystal panel module LCDM according to the first embodiment of the present disclosure includes a rear cover 179, an LED substrate 178, a cover bottom 171, a reflective sheet (or a reflective plate) 172, a light guide plate 175, optical sheets 176, a guide panel 177, and a liquid crystal panel 160.

The cover bottom 171, the LED substrate 178, the reflective sheet 172, the light guide plate 175, and the optical sheets 176 may be included in a backlight unit 170. The backlight unit 170 is accommodated in the rear cover 179, and the liquid crystal panel 160 sits on the guide panel 177 secured to the rear cover 179.

The reflective sheet 172 sits inside the cover bottom 171. The reflective sheet 172 reflects light in the bottom of the light guide plate 175. The light guide plate 175 sits on the reflective sheet 172. The light guide plate 175 converts light, emitted from an LED, into a surface light source. The LED substrate 178 having LEDs 189 mounted thereon is installed in a light entrance surface (a light entrance unit or a side surface) of the light guide plate 175.

The optical sheets 176 sits on the light guide plate 175. The optical sheets 176 collects and diffuses light emitted from the light guide plate 175. The optical sheets 176 is composed of a plurality of sheets having one or more structure and functions.

The guide panel 177 sits on the cover bottom 171 and is coupled to the rear cover 179. The guide panel 177 supports the liquid crystal panel 160, and prevents the optical sheets 176 from moving so that the optical sheets 176 are safely accommodated and fixed in the cover bottom 171. The guide panel 177 has a frame shape (e.g., having a region exposing a display surface and a region not exposing the display surface) which allows light emitted through the optical sheets 176 to pass therethrough.

The liquid crystal panel 160 sits on the guide panel 177. The liquid crystal panel 160 displays an image. The liquid crystal panel 160 includes a lower substrate in which a switching transistor and the like are formed, an upper substrate in which a color filter and the like are formed, and a liquid crystal layer formed between the lower substrate and the upper substrate.

As illustrated in FIGS. 3 to 5, the liquid crystal panel module LCDM according to the first embodiment of the present disclosure has a display surface (a front surface) in which an image is capable of being displayed. A rear surface of the liquid crystal panel module LCDM is covered by the board-type cover bottom 171.

As shown in the enlarged view of FIG. 5, the present disclosure includes hooks GPH, CBH, and BLH to improve an assembly structure of the liquid crystal panel module LCDM. The hooks GPH, CBH, and BLH are spaced a predetermined distance from each other. The hooks GPH, CBH, and BLH protrude from surfaces so that a guide panel 177 and a cover bottom 171 are fitted to latching portions of the rear cover 179 to be coupled thereto. In the drawings, the order of alignment of the hooks GPH, CBH, and BLH is exemplary, but the roles thereof are as below.

The hook GPH disposed at a section of A1-A2 is defined as a first hook or a guide panel hook which helps the guide panel 177 and the rear cover 179 to be coupled to each other. The hook CBH disposed at a section of B1-B2 is defined as a second hook or a cover bottom hook which helps the cover bottom 171 and the rear cover 179 to be coupled to each other. The hook BLH disposed at a section of C1-C2 is defined as a third hook or a backlight hook (BLU Hook) which helps the cover bottom 171 and the rear cover 179 to be coupled to each other.

Figure 6:
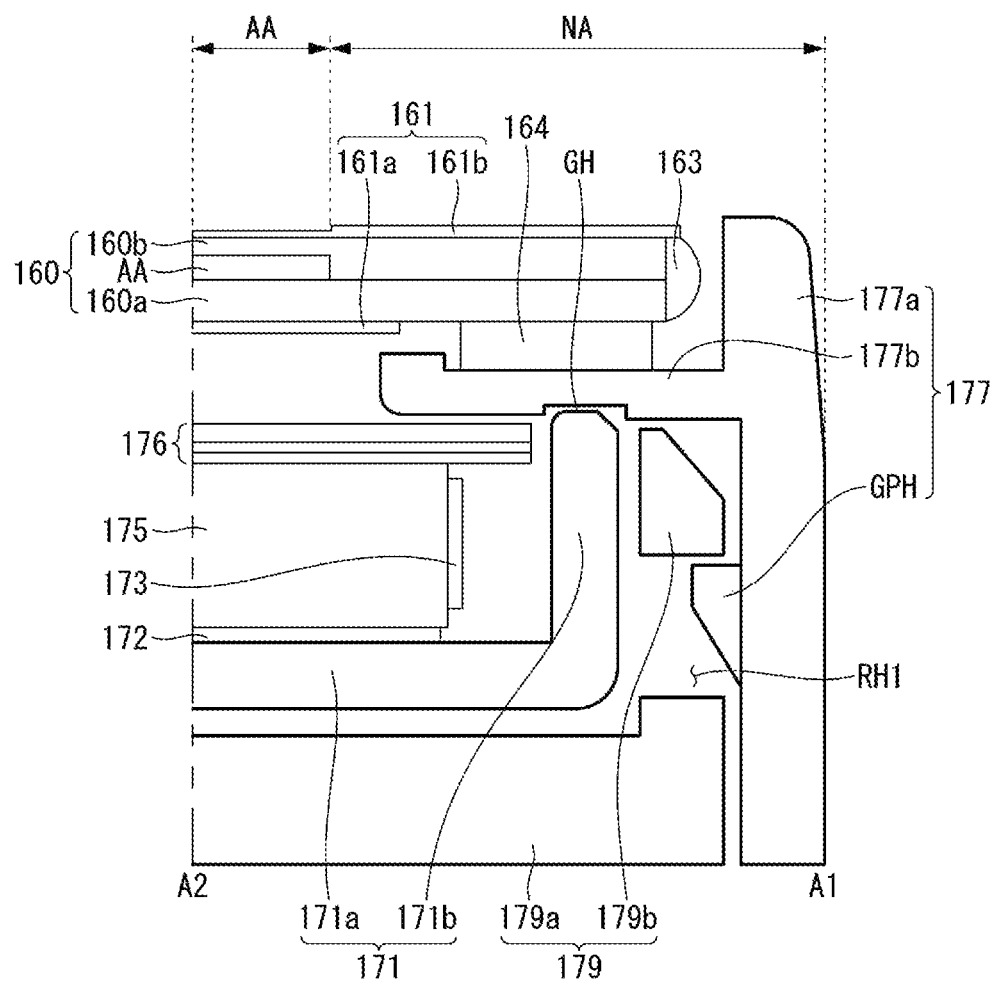
FIG. 6 is a cross-sectional view showing an A1-A2 area shown in FIG. 5.
Figure 7:
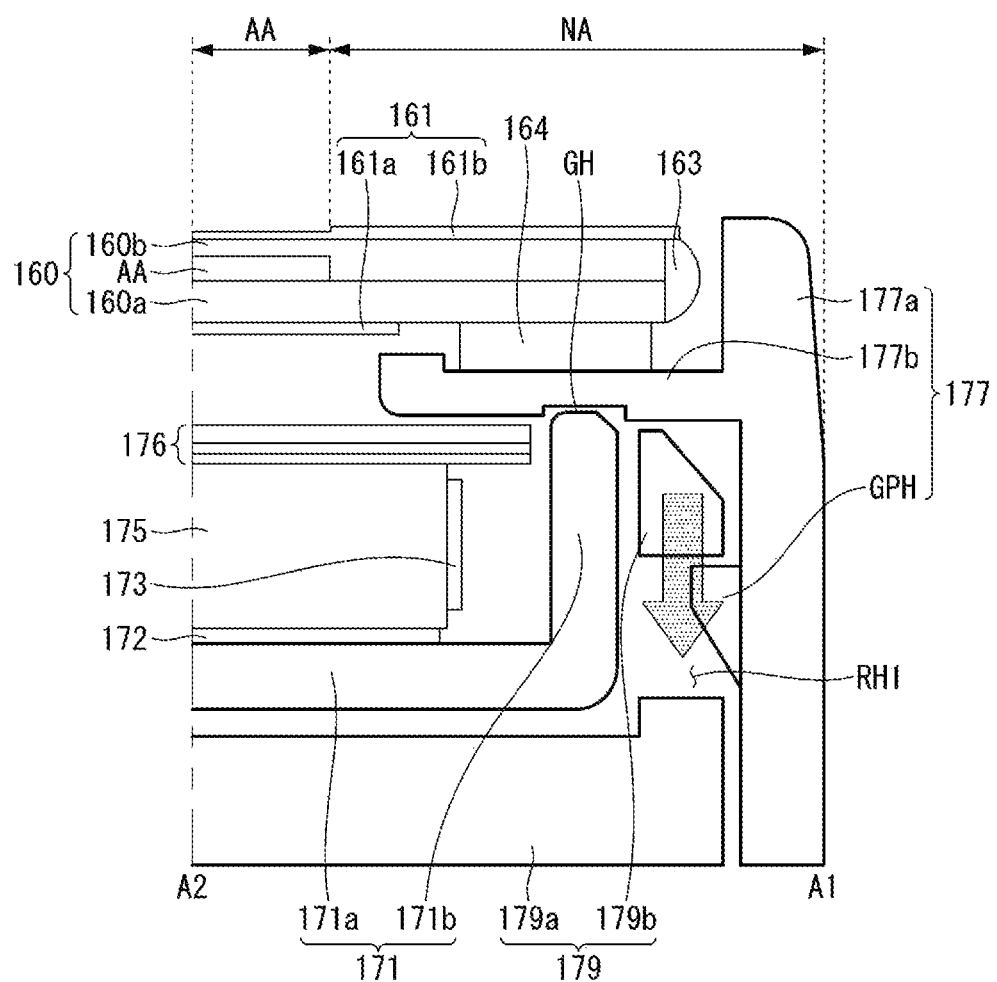
FIG. 7 is a diagram for explaining effects of the first hook shown in FIG. 6.

FIG. 6 is a cross-sectional view showing an A1-A2 area shown in FIG. 5, and FIG. 7 is a diagram for explaining effects of the first hook shown in FIG. 6.

As illustrated in FIG. 6, the rear cover 179, the cover bottom 171, the reflective sheet 172, the light guide plate 175, a lateral reflective sheet 173, the optical sheets 176, the guide panel 177, a foam pad 164, and the liquid crystal panel 160 are partially illustrated in the cross-sectional view of the A1-A2 area.

The cover bottom 171 accommodates the reflective sheet 172, the light guide plate 175, the lateral reflective sheet 173, and the optical sheets 176. The cover bottom 171 may be formed of a metal material having high thermal conductivity. The cover bottom 171 includes a board-type bottom base 171a, and a bottom side wall 171b. The bottom base 171a and the bottom side wall 171b provide a space which accommodates the reflective sheets 172 while preventing the same from moving. The reflective sheet 172 is disposed at the base of the cover bottom 171. The light guide plate 175 is disposed on the reflective sheet 172. The lateral reflective sheet 173 is attached to one lateral surface of the light guide plate 175. The optical sheets 176 are disposed on the light guide plate 175.

The rear cover 179 accommodates the cover bottom 171. The rear cover 179 includes: a cover base 179a capable of supporting the bottom base 171a of the cover bottom 171; and a cover side wall 179b acting as a wall which covers the bottom side wall 171b of the cover bottom 171. The cover base 179a and the cover side wall 179b provide a space which accommodates the cover bottom 171 while preventing the same from moving.

The cover side wall 179b includes a first latching portion RH1 into which the first hook GPH of the guide panel 177 is capable of being inserted. The first latching portion RH1 may have a shape of a groove recessed from the cover side wall 179b or a hole penetrating the cover side wall 179b. The first latching portion RH1 may be defined as a panel hook latching portion.

In the present disclosure, each of the first hook GPH and the first latching portion RH1 has a rectangular shape, as shown in FIG. 5. However, it is merely an exemplary, and each of the first hook GPH and the first latching portion RH1 may have a quadrangular shape including a rectangular shape and a square shape, a trapezoidal shape, an elliptical shape, a circular shape, a polygonal shape, etc.

The liquid crystal panel 160 includes a lower substrate 160a and an upper substrate 160b which are laminated with a display area AA therebetween. Polarizers including a first polarizer 161a and a second polarizer 161b are attached to the front and rear surface of the liquid crystal panel 160. A side surface sealant 163 is attached to at least one side surface of the liquid crystal panel 160.

The side surface sealant 163 protects the side surface of the liquid crystal panel 160. The side surface sealant 163 reduces a shock occurring when a side surface of the liquid crystal panel 160 collides with a side surface of the guide panel 177. That is, the side surface sealant 163 prevents damage caused by an external shock to the liquid crystal panel module LCDM.

The liquid crystal panel 160 is attached to a panel support 177b of the guide panel 177 by the foam pad 164 disposed on a non-display area NA. The foam pad 164 may be formed of an elastic material, and may be in a structure such that an adhesive or a tape is attached to both surfaces of the foam pad 164.

The foam pad 164 may have a shape of a closed-curve frame (edge) corresponding to four surfaces of the liquid crystal panel 160. The foam 164 allows the liquid crystal panel 160 to be attached and fixed to the panel support 177b of the guide panel 177, and prevents a foreign substance from coming inside. In addition, The foam pad 164 may include a black material in order to prevent light leakage which is a leakage of light entering through the light guide plate 175 to the outside, but aspects of the present disclosure are limited thereto.

The guide panel 177 supports the liquid crystal panel 160 and is coupled to the rear cover 179. The guide panel 177 includes a panel support 177b supporting the liquid crystal panel 160 while preventing the cover bottom 171 from moving, and a panel side wall 177a covering the cover side wall 179b of the rear cover 179. The guide panel 177 includes a panel groove GH preventing the upper surface of the cover bottom 171 from moving or deviating, and the first hook GPH to be inserted into the first latching portion RH1.

A height of the panel side wall 177a may correspond to a height of the front surface of the liquid crystal panel 160 (or a surface height of the second polarizer). For example, the panel side wall 177a may extend to a level that is at least equal to a level of the front surface of the liquid crystal panel 160. If the height of the panel side wall 177a corresponds to the height of the front surface of the liquid crystal panel 160, a mechanical protective wall for protecting the liquid crystal panel 160 from an external shock may be formed. The guide panel 177 constitutes an external side wall of the liquid crystal module assembly. Thus, in order to externalize the liquid crystal panel module assembly, the panel side wall 177a may have a round-shaped edge of an outer wall which does not face the side surface sealant 163.

The panel groove GH is disposed at a rear surface of the panel support 177b of the guide panel 177. The panel groove GH is disposed at a portion corresponding to the upper surface of the cover bottom 171, e.g., corresponding to an upper surface of the bottom side wall 171b of the cover bottom 171. The first hook GPH protrudes inwardly from the panel side wall 177a to correspond to a position of a first latching portion RH1 provided in the cover side wall surface 179b. The first hook GPH includes a protruding portion (e.g., a laterally protruding portion) which protrudes not to be inclined from the panel side wall 177a, and an inclined portion which protrudes to be inclined from the panel side wall 177a. That is, the protruding portion is not inclined, but instead protrudes inwardly and forms a substantially flat surface, e.g., the upper surface of the first hook GPH, while the inclined portion protrudes at an incline from an inner side surface of the panel side wall 177a, as shown in FIG. 6. The protruding portion of the first hook GPH has a surface extending in a direction facing the panel support 177b (e.g., an upper surface of the protruding portion extends in a direction facing toward the top in the drawing), and the inclined portion thereof has a surface extending in a direction facing the cover base 179a (e.g., a direction toward the bottom in the drawing). As used herein, the term "facing" does not necessarily mean that two surfaces or directions are parallel to one another; instead, a first surface (e.g., the surface of the inclined portion of the first hook GPH) may face second surface or direction (e.g., an upper surface or portion of the cover base 179a), even though the surfaces are not parallel to one another, as long as some part of the first surface faces some part of the second surface.

The protruding portion of the first hook GPH is flat in a horizontal direction like the upper side of the first latching portion RH1 of the rear cover 179, but the inclined portion of the first hook GPH has a slope of a predetermined angle unlike the lower side of the first latching portion RH1 of the rear cover 179. The first hook GPH provides a structure which alleviates difference in size and rigidity between the guide panel 177 and the rear cover 179 and even pressure and stress possibly occurring upon coupling of the guide panel 177 and the rear cover 179 due to such difference, and which supplements a coupling force between the guide panel 177 and the rear cover 179.

As illustrated in FIG. 7, the protruding portion of the first hook GHP helps the guide panel 177 and the rear cover 179 coupling to each other to maintain a strong coupling force without being easily separated. That is, the protruding portion of the first hook GPH plays a role of preventing the rear cover 179 and the guide panel 177 from being easily separated in a direction (the direction toward the bottom in the drawing) opposite to a direction in which the rear cover 179 and the guide panel 177 are inserted to be coupled to each other.

In addition, the first hook GPH provides a structure in which the first hook GPH is inserted into the first latching portion RH1 by slidably passing the cover side wall 179b when the guide panel 177 and the rear cover 179 are coupled to each other. In this process, in order to make the coupling easier, the upper part of the cover side wall 179b may have an outer side wall with a round-shaped edge to correspond to the position of the first hook GPH, but embodiments of the present disclosure are not limited thereto. The outer side wall is a wall of the cover side wall 179b which faces the panel side wall 177a of the guide panel 177.

Thus, the first hook GPH of the guide panel 177 and the first latching portion RH1 of the rear cover 179 provide an easier coupling structure in an assembling process to modulate the liquid crystal panel, and also helps the guide panel 177 and the rear cover 179 to maintain a strong coupling force while preventing the guide panel 177 and the rear cover 179 from being easily separated from each other. In addition, a coupling structure in which no space is formed between the guide panel 177 and the rear cover 179 is provided, thereby improving adhesion between the guide panel 177 and the rear cover 179. As a result, even a space between a side surface of the liquid crystal panel 160 and the rear cover 179 is reduced, and therefore, a bezel may be reduced and exterior design (externalization of mechanism of the front surface) may improve. In addition, as a coupling structure using a hook is provided, assembling efficiency may improve and a re-assembling error rate may be reduced.

Figure 8:
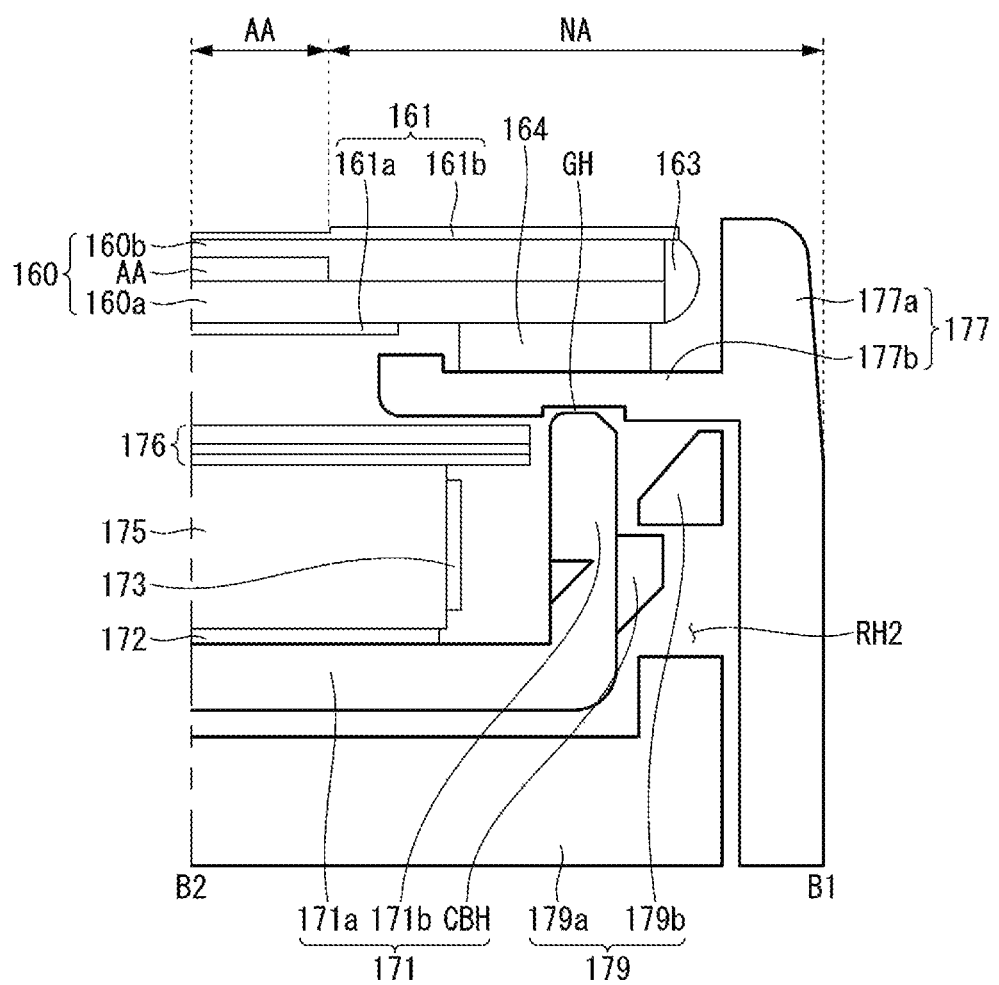
FIG. 8 is a cross-sectional view of a B1-B2 area shown in FIG. 5.
Figure 9:
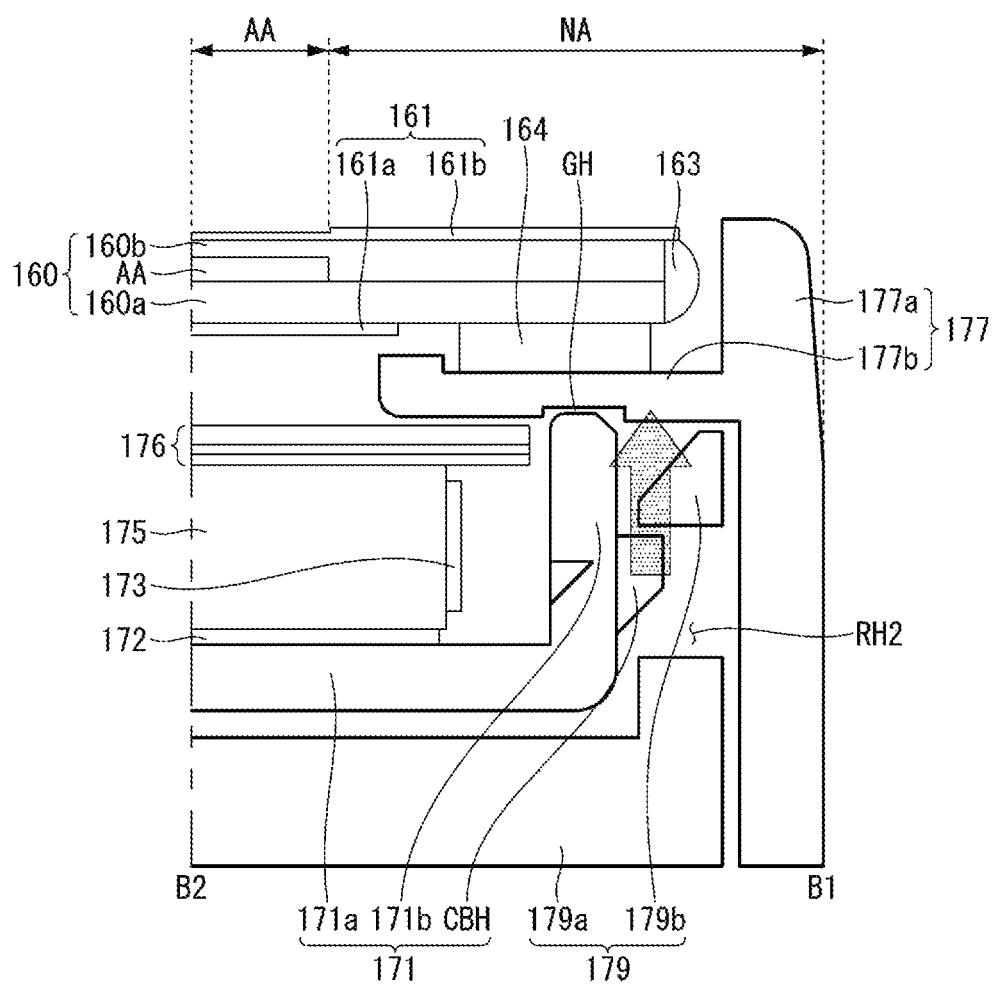
FIG. 9 is a diagram for explaining effects of the second hook shown in FIG. 8.

FIG. 8 is a cross-sectional view of a B1-B2 area shown in FIG. 5, and FIG. 9 is a diagram for explaining effects of the second hook shown in FIG. 8.

As illustrated in FIG. 8, the rear cover 179, the cover bottom 171, the reflective sheet 172, the light guide plate 175, the lateral reflective sheet 173, the optical sheets 176, the guide panel 177, the foam pad 164, and the liquid crystal panel 160 are partially shown in the cross sectional view of the B1-B2 area.

The rear cover 179 accommodates the cover bottom 171. The rear cover 179 includes a cover base 179a supporting the bottom base 171a of the cover bottom 171, and a cover side wall 179b acting as a side wall covering the bottom side wall 171b of the cover bottom 171. The cover base 179a and the cover side wall 179b provide a space which accommodates the cover bottom 171 while preventing the same from moving.

The cover side wall 179b has a second latching portion RH2 into which the second hook CBH of the cover bottom 171 is to be inserted. The second latching portion RH2 may have a shape of a groove recessed from the cover side wall 179b or a hole penetrating the cover side wall 179b. The second latching portion RH2 may be defined as a cover bottom hook latching portion.

In the present disclosure, the second hook CBH and the second latching portion RH2 may have a trapezoidal shape, as shown in FIG. 5. However, the trapezoidal shape is merely exemplary, and the second hook portion CBH and the second latching portion RH2 may have a quadrangular shape, including a rectangular shape and a square shape, an elliptical shape, a circular shape, a polygonal shape, etc.

The cover bottom 171 accommodates the reflective sheet 172, the light guide plate 175, the lateral reflective sheet 173, and the optical sheets 176. The cover bottom 171 includes a board-type bottom base 171a, a bottom side wall 171b acting as a wall covering the board-type bottom base 171a, and the second hook CBH to be inserted into the second latching portion RH2 of the rear cover 179. The bottom base 171a and the bottom side wall 171b provide a space which accommodates the reflective sheet 172 while preventing the same from moving.

The second hook CBH includes a protruding portion (e.g., a laterally protruding portion) which protrudes not to be inclined from the bottom side wall 171b, and an inclined portion which protrudes to be inclined from the bottom side wall 171b. The protruding portion of the second hook CBH protrudes outwardly from the bottom side wall 171b and has a surface (e.g., an upper surface) that extends in a direction facing the panel support 177b (e.g., a direction toward the top in the drawing), and the inclined portion of the second hook CBH has a surface extending in a direction facing the cover base 179*a* (e.g., a direction toward the bottom in the drawing).

The protruding portion of the second hook CBH is flat in a horizontal direction like the upper part of the second latching portion RH2 of the rear cover 179, but the inclined portion of the second hook CBH has a slope of a predetermined angle unlike the lower part of the second latching portion RH2 of the rear cover 179. The second hook CBH provides a structure which alleviates difference in size and rigidity between the cover bottom 171 and the rear cover 179 and even pressure and stress possibly occurring upon coupling of the cover bottom 171 and the rear cover 179 due to such difference, and which supplements a coupling force between the cover bottom 171 and the rear cover 179. The protruding and inclined portions of the second hook CBH are different from the protruding and inclined portions of the first hook GPH in terms of protruding and inserted positions, but have similar or identical shapes to those of the protruding and inclined portions of the first hook GPH. That is, each of the second hook CBH and the first hook GPH has a portion which protrudes from a surface and which is inclined facing the cover base 179*a* of the rear cover 179.

As illustrated in FIG. 9, the protruding portion of the second hook CBH helps the cover bottom 171 and the rear cover 179 being coupled thereto to maintain a strong coupling force without being easily separated. That is, the protruding portion of the second hook CBH plays a role of preventing the rear cover 179 and the cover bottom 171 from being easily separated in a direction (the direction toward the bottom in the drawing) opposite to a direction in which the rear cover 179 and the cover bottom 171 are inserted to be coupled to each other.

In addition, the second hook CBH provides a structure in which the second hook CBH is inserted into the second latching portion RH2 by slidably passing the cover side wall 179*b* when the cover bottom 171 and the rear cover 179 are coupled to each other. In this process, in order to make the coupling easier, the upper part of the cover side wall 179*b* may have an inner side wall with a round-shaped edge to correspond to the position of the second hook CBH, but embodiments of the present disclosure are not limited thereto. The inner side wall is a wall of the cover side wall 179*b* of the rear cover 179 which faces the bottom side wall 171*b* of the cover bottom 171.

Thus, the second hook CBH of the cover bottom 171 and the second latching portion RH2 of the rear cover 179 provide an easier coupling structure in an assembling process to modulate the liquid crystal panel, and also helps the cover bottom 171 and the rear cover 179 to maintain a strong coupling force while preventing the cover bottom 171 and the rear cover 179 from being easily separated from each other. In addition, a coupling structure in which no space is formed between the cover bottom 171 and the rear cover 179 is provided, thereby improving adhesion between the cover bottom 171 and the rear cover 179. As a result, even a space between a side surface of the liquid crystal panel 160 and the rear cover 179 is reduced, and therefore, a bezel may be reduced and exterior design (externalization of mechanism of the front surface) may improve. In addition, as a coupling structure using a hook is provided, assembling efficiency may improve and a re-assembling error rate may be reduced.

Figure 10:
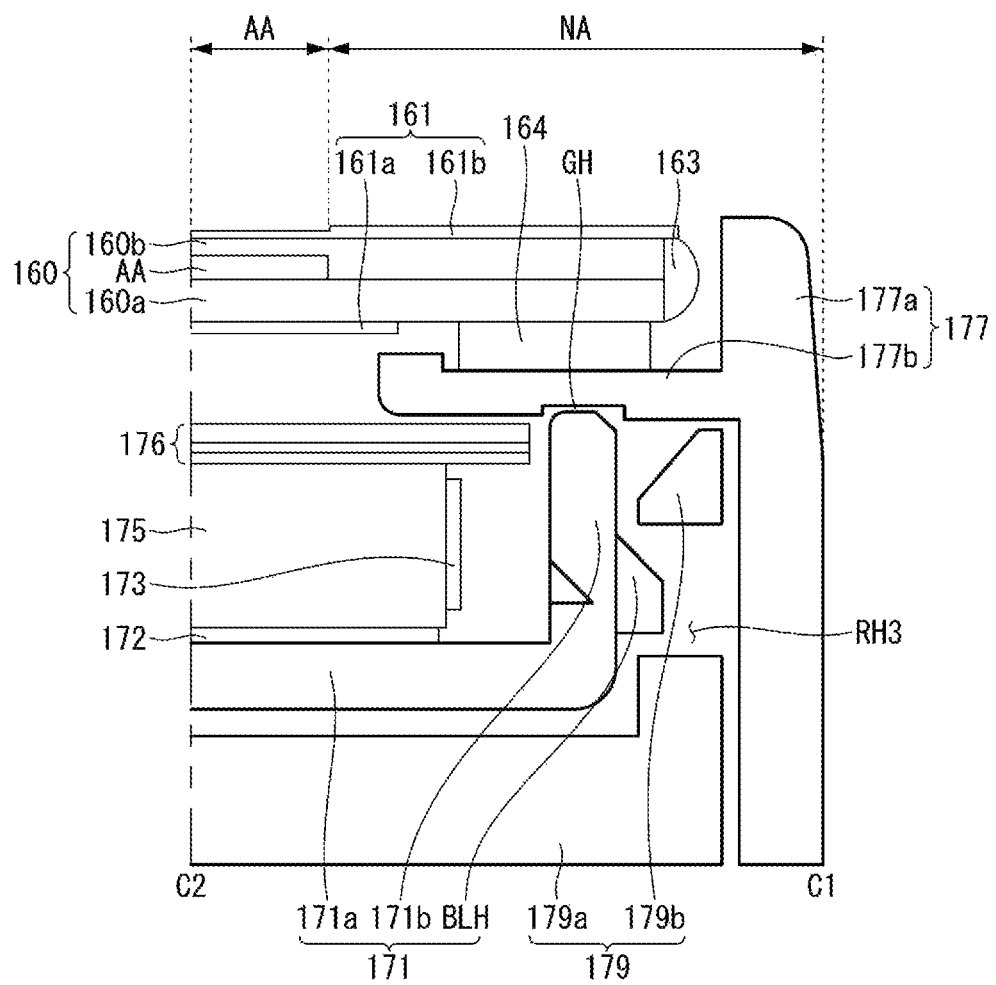
FIG. 10 is a cross-sectional view of the C1-C2 area shown in FIG. 5.

FIG. 10 is a cross-sectional view of the C1-C2 area shown in FIG. 5.

As illustrated in FIG. 10, the rear cover 179, the cover bottom 171, the reflective sheet 172, the light guide plate 175, the lateral reflective sheet 173, the optical sheets 176, the guide panel 177, the foam pad 164, and the liquid crystal panel 160 are partially shown in the cross-sectional view of the C1-C2 area.

The rear cover 179 accommodates the cover bottom 171. The rear cover 179 includes a cover base 179*a* supporting the bottom base 171*a* of the cover bottom 171, and a cover side wall 179*b* acting as a side wall covering the bottom side wall 171*b* of the cover bottom 171.

The cover base 179*a* and the cover side wall 179*b* provide a space which accommodates the cover bottom 171 while preventing the same from moving. The cover side wall 179*b* has a third latching portion RH3 into which the third hook BLH of the cover bottom 171 is to be inserted. The third latching portion RH3 may have a shape of a groove recessed from the cover side wall 179*b* or a hole penetrating the cover side wall 179*b*. The third latching portion RH3 may be defined as a backlight hook latching portion.

In some embodiments of the present disclosure, each of the third hook BLH and the third latching portion RH3 has a rectangular shape, as shown in FIG. 5. However, the rectangular shape is merely an exemplary, and each of the third hook BLH and the third latching portion RH3 may have a quadrangular shape including a rectangular shape and a square shape, a trapezoidal shape, an elliptical shape, a circular shape, a polygonal shape, etc.

The cover bottom 171 accommodates the reflective sheet 172, the light guide plate 175, the lateral reflective sheet 173, and the optical sheets 176. The cover bottom 171 includes a board-type bottom base 171*a*, a bottom side wall 171*b* acting as a wall covering the board-type bottom base 171*a*, and the third hook BLH to be inserted into the third latching portion RH3 of the rear cover 179. The bottom base 171*a* and the bottom side wall 171*b* provide a space which accommodates the reflective sheet 172 while preventing the same from moving.

The third hook BLH includes a protruding portion (e.g., a laterally protruding portion) which protrudes not to be inclined from the bottom side wall 171*b*, and an inclined portion which protrudes to be inclined from the bottom side wall 171*b*. The protruding portion of the third hook BLH protrudes outwardly from the bottom side wall 171*b* and has a surface (e.g., a lower surface) that extends in a direction facing the cover base 179*a* (e.g., a direction toward the bottom in the drawing), and the inclined portion thereof has a surface extending in a direction facing the panel support 177*b* (a direction toward the top in the drawing). The protruding portion of the third hook BLH is flat in a horizontal direction like the lower part of the third latching portion RH3 of the rear cover 179, but the inclined portion of the third hook BLH has a slope of a predetermined angle unlike the upper part of the third latching portion RH3 of the rear cover 179.

The third hook BLH and the second hook CBH are disposed at the cover bottom 171. However, the protruding and inclined portions of the third hook BLH have shapes opposite to those of the protruding and inclined portions of the second shook CBH. That is, the protruding and inclined portions of the third hook BLH has shapes which is like the protruding and inclined portions of the second hook CBH rotated by 180 degrees. Since the third hook BLH and the second hook CBH have opposite shapes, this may further increase a coupling force between the cover bottom 171 and the rear cover 179.

Thus, the third hook BLH of the cover bottom 171 and the third latching portion RH3 of the rear cover 179 provide an easier coupling structure in an assembling process to modulate the liquid crystal panel, and also helps the cover bottom 171 and the rear cover 179 to maintain a strong coupling force while preventing the cover bottom 171 and the rear cover 179 from being easily separated from each other.

Figure 11:
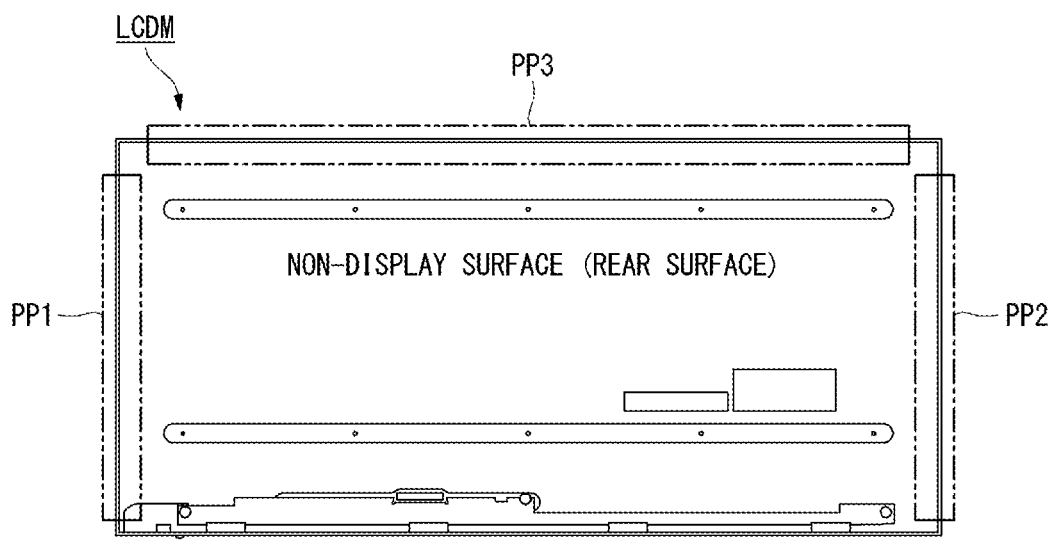
FIGS. 11 and 12 are diagrams illustrating examples of arrangement of the first, second, and third hooks.
Figure 12:
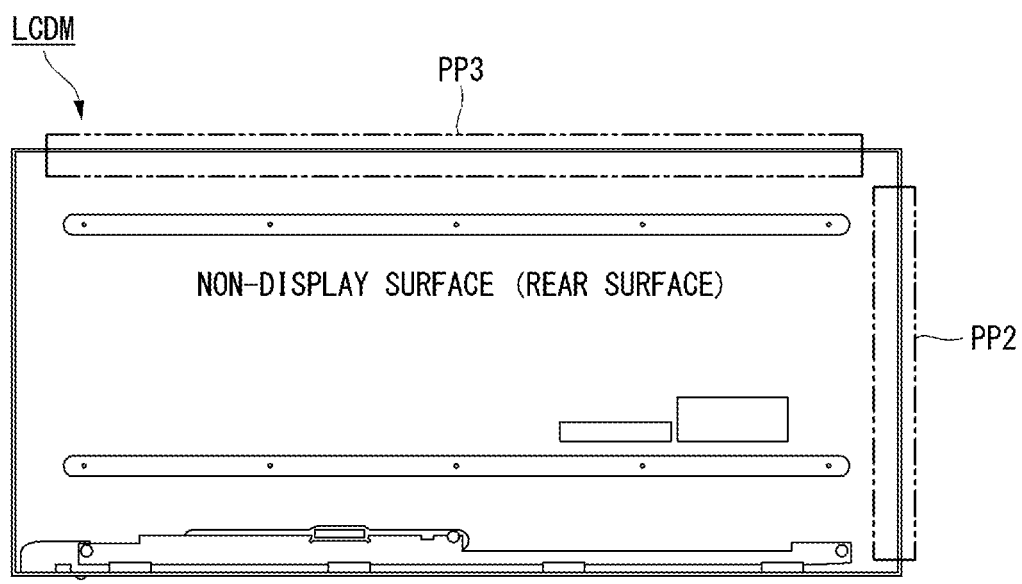

FIGS. 11 and 12 are diagrams illustrating examples of arrangement of the first, second, and third hooks.

As illustrated in FIGS. 5 and 11, the first, second, and third hooks GPH, CBH, and BLH may be a plurality of hooks disposed at three surfaces of the liquid crystal panel module LCDM. For example, the first, second, and third hooks GPH, CBH, and BLH may be a plurality of hooks disposed at a left side surface PP1, a right side surface PP2, and an upper surface PP3 of the liquid crystal panel module LCDM. In this case, the first, second, and third hooks GPH, CBH, and BLH may be arranged such that each hook is disposed at a particular point or at least two or three hooks are disposed at a particular point, but embodiments of the present disclosure are not limited thereto. In some embodiments, each of the left side surface PP1, the right side surface PP2, and the upper surface PP3 may include at least one of each of the first, second, and third hooks GPH, CBH, BLH.

As illustrated in FIGS. 5 and 12, the first, second, and third hooks GPH, CBH, and BLH may be a plurality hooks disposed at two surfaces of the liquid crystal panel module LCDM. For example, the first, second, and third hooks GPH, CBH, and BLH may be a plurality of hooks disposed at a right side surface PP2 and an upper surface PP3 of the liquid crystal panel module LCDM. In this case, the first, second, and third hooks GPH, CBH, and BLH may be provided such that each hook is disposed at a particular point or at least two or three hooks are disposed at a particular point, but aspects of the present disclosure are not limited thereto. In some embodiments, each of the right side surface PP2 and the upper surface PP3 may include at least one of each of the first, second, and third hooks GPH, CBH, BLH.

As illustrated in FIGS. 11 and 12, the first, second, and third hooks GPH, CBH, and BLH may be a plurality hooks to provide a coupling force corresponding to the size of the liquid crystal panel 160, or may be provided as an individual hook or a group of hooks.

At least one of the first, second, and third hooks GPH, CBH, and BLH described with reference to FIGS. 5 and 12 supplements a coupling force between the guide panel 177 and the rear cover 179 in response to occurrence of a size deviation of the rear cover 179. In one example, if the rear cover 179 has a small size, the second hook CBH supplements a coupling force between the guide panel 177 and the rear cover 179. In another example, if the rear cover 179 has a large size, the first hook GPH supplements a coupling force between the guide panel 177 and the rear cover 179.

Figure 13:
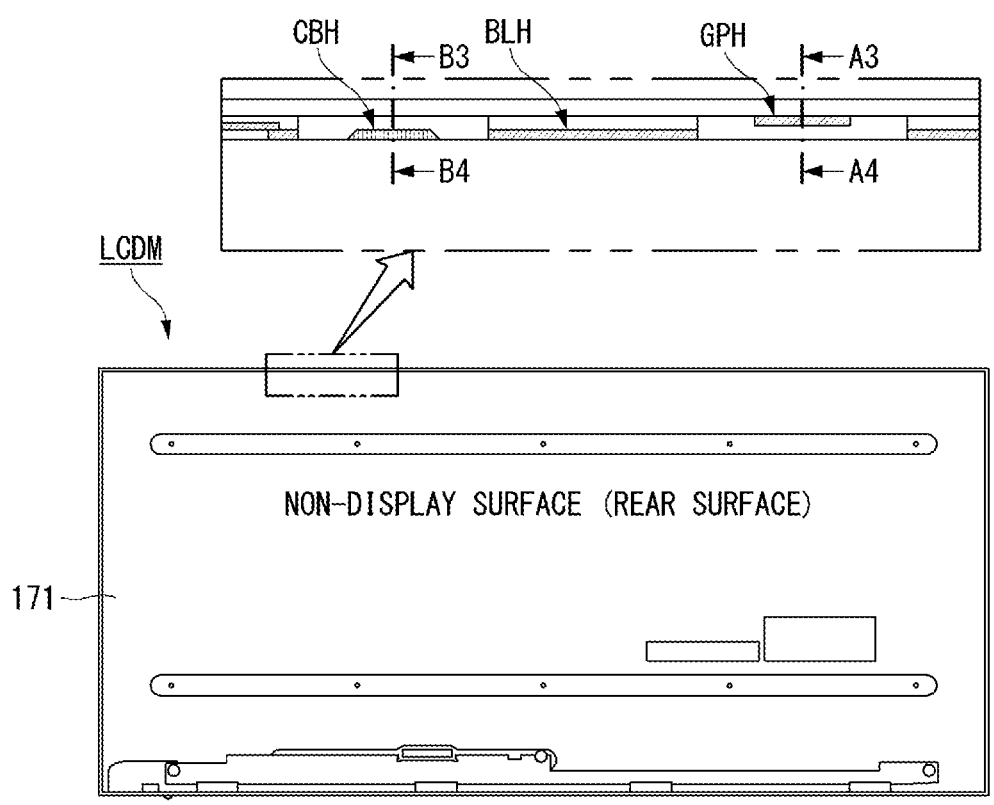
FIG. 13 is a diagram illustrating a rear surface of a liquid crystal panel module assembly according to a second embodiment of the present disclosure.
Figure 14:
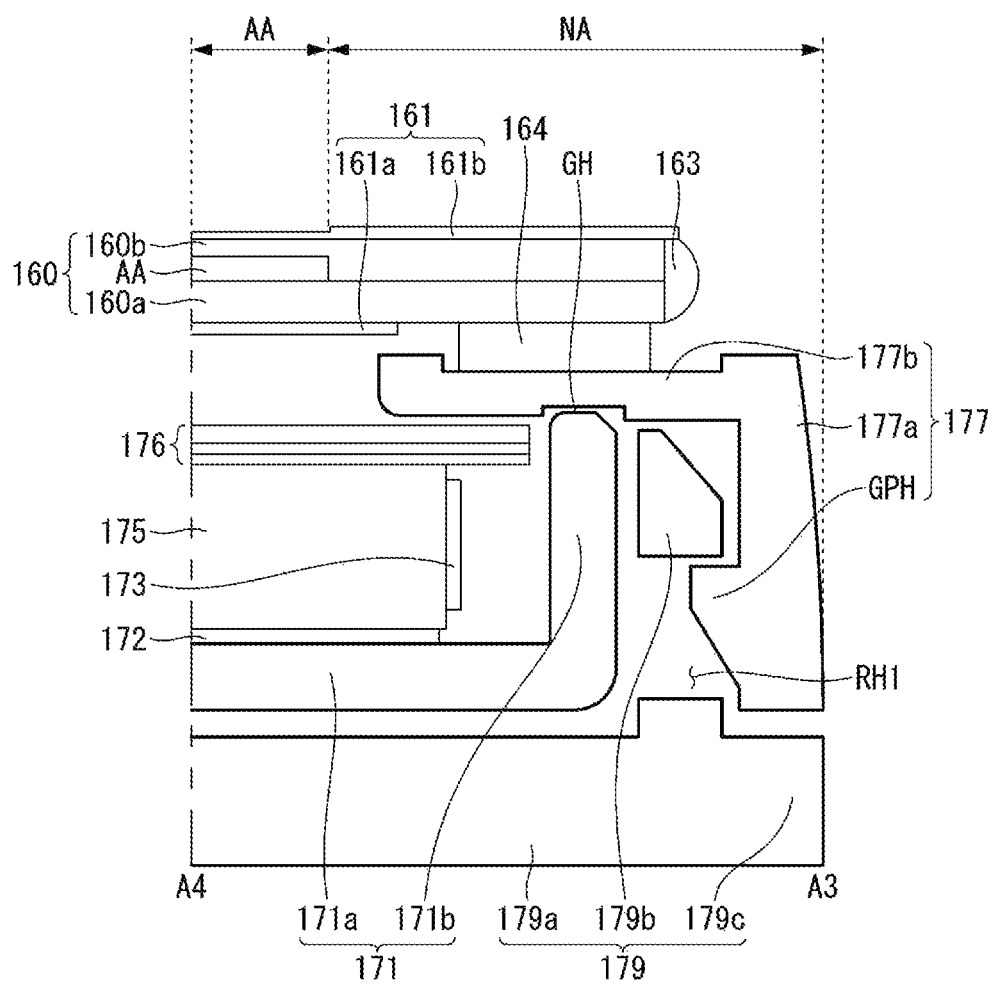
FIG. 14 is a cross-sectional view of an A3-A4 area shown in FIG. 13.
Figure 15:
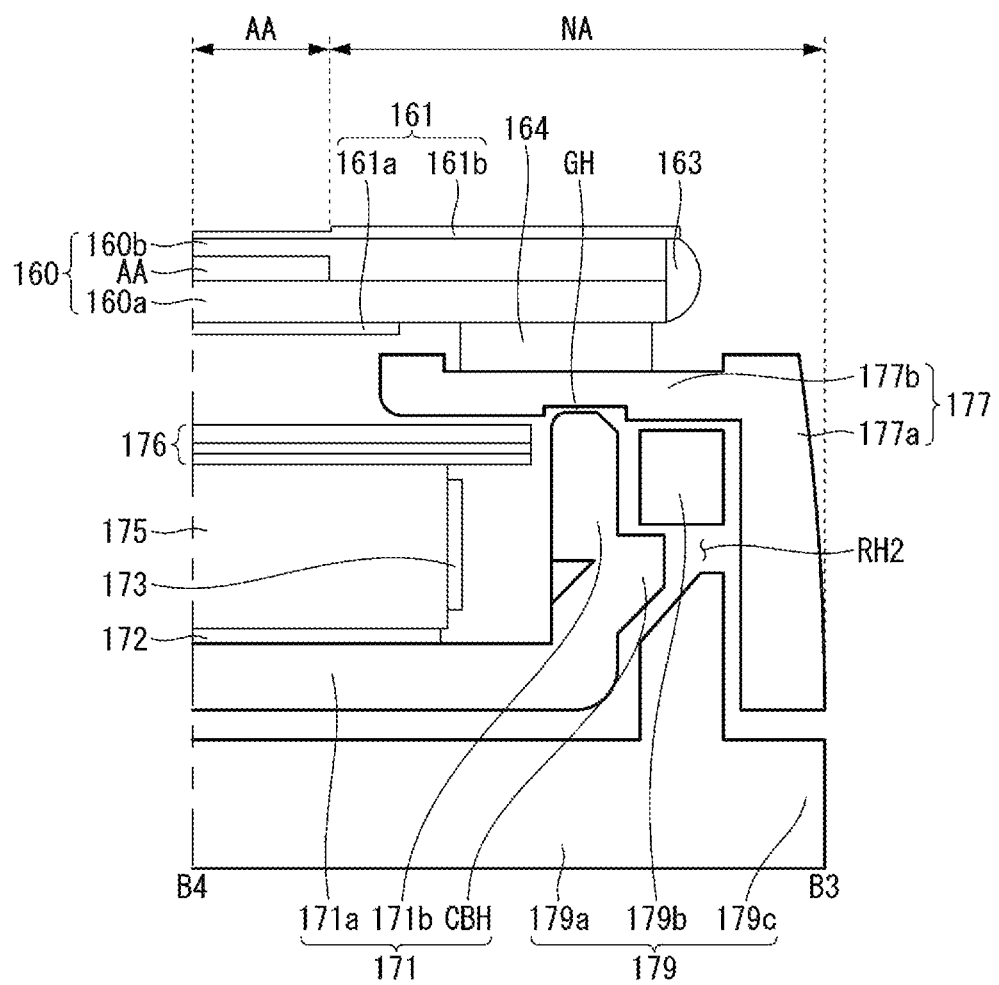
FIG. 15 is a cross-sectional view of a B3-B4 area shown in FIG. 13.

FIG. 13 is a diagram illustrating a rear surface of a liquid crystal panel module assembly according to a second embodiment of the present disclosure, FIG. 14 is a cross-sectional view of an A3-A4 area shown in FIG. 13, and FIG. 15 is a cross-sectional view of a B3-B4 area shown in FIG. 13.

As illustrated in FIG. 13, the liquid crystal panel module LCDM according to the second embodiment of the present disclosure may include a display surface (a front surface) in which an image is capable of being displayed. A rear surface of the liquid crystal panel module LCDM is covered by a board-type cover bottom 171.

As illustrated in the enlarged view of FIG. 13, the liquid crystal panel module LCDM includes hooks GPH, CBH, and BLH for improving an assembling structure. The hooks GPH, CBH, and BLH are spaced a predetermined apart from each other. The hooks GPH, CBH, and BLH respectively protrude from surfaces so that a guide panel 177 and a cover bottom 171 are fitted to latching portions of the rear cover 179 to be coupled thereto. In the drawings, the order of arrangement of the hooks GPH, CBH, and BLH are merely exemplary, but the roles thereof may be defined as below.

The hook GPH disposed at a cross section of A3-A4 is defined as a first hook or a guide panel hook which helps the guide panel 177 and the rear cover 179 to be coupled to each other. The hook CBH disposed at a cross section of B3-B4 is defined as a second hook or a cover bottom hook which helps the cover bottom 171 and the rear cover 179 to be coupled to each other. The hook BLH is defined as a third hook or a BLU hook which helps the cover bottom 171 and the rear cover 179 to be coupled to each other. The hook BLH may be formed in the same structure as shown in the first embodiment, and thus a description thereof will be herein omitted.

As illustrated in FIG. 14, the rear cover 179, the cover bottom 171, the reflective sheet 172, the light guide plate 175, the lateral reflective sheet 173, optical sheets 176, a guide panel 177, the foam pad 164, and the liquid crystal panel 160 are partially shown in the cross section of the A3-A4 area.

The cover bottom 171 accommodates the reflective sheet 172, the light guide plate 175, the lateral reflective sheet 173, and the optical sheets 176. The cover bottom 171 may be formed of a metal material having high thermal conductivity. The cover bottom 171 includes a board-type bottom base 171a, and a bottom side wall 171b. The bottom base 171a and the bottom side wall 171b provide a space which accommodates the reflective sheets 172 while preventing the same from moving. The reflective sheet 172 is disposed at the base of the cover bottom 171. The light guide plate 175 is disposed on the reflective sheet 172. The lateral reflective sheet 173 is attached to one side surface of the light guide plate 175. The optical sheets 176 are disposed on the light guide plate 175.

The rear cover 179 accommodates the cover bottom 171. The rear cover 179 includes a cover base 179a capable of supporting the bottom base 171a of the cover bottom 171, and a cover side wall 179b acting as a wall covering the bottom side wall 171b of the cover bottom 171, and a cover protruding surface 179c supporting the guide panel 177. The cover base 179a and the cover side wall 179b provide a space which accommodates the cover bottom 171 while preventing the same from moving. The cover side wall 179b includes a first latching portion RH1 into which the first hook GPH of the guide panel 177 is capable of being inserted. The first latching portion RH1 may have a shape of a groove recessed from the cover side wall 179b or a hole penetrating the cover side wall 179b. The first latching portion RH1 may be defined as a panel hook latching portion.

In the present disclosure, each of the first hook GPH and the first latching portion RH1 may have a rectangular shape, as shown in FIG. 13. However, this is merely an exemplary, and each of the first hook GPH and the first latching portion RH1 may have a quadrangular shape including a rectangular shape and a square shape, a trapezoidal shape, an elliptical shape, a circular shape, a polygonal shape, etc.

The liquid crystal panel 160 includes a lower substrate 160a and an upper substrate 160b which are laminated with a display area AA therebetween. Polarizers 161 including a first polarizer 161a and a second polarizer 161b are attached to the front and rear surfaces of the liquid crystal panel 160. A side surface sealant 163 is attached to at least one side surface of the liquid crystal panel 160.

The side surface sealant 163 protects the side surface of the liquid crystal panel 160. The side surface sealant 163 reduces a shock when a side surface of the liquid crystal panel 160 collides with a side surface of the guide panel 177. That is, the side surface sealant 163 prevents damage caused by an external shock to the liquid crystal panel module LCDM.

The liquid crystal panel 160 is attached to a panel support 177b of the guide panel 177 by the foam pad 164 disposed on a non-display area NA. The foam pad 164 may be formed of an elastic material, and may be in a structure such that an adhesive or a tape is attached to both surfaces of the foam pad 164.

The foam pad 164 may have a shape of a closed-curve frame (edge) corresponding to four surfaces of the liquid crystal panel 160. The foam 164 allows the liquid crystal panel 160 to be attached and fixed to the panel support 177b of the guide panel 177, and prevents a foreign substance from coming inside. In addition, The foam pad 164 may include a black material in order to prevent light leakage which is a leakage of light entering through the light guide plate 175 to the outside, but aspects of the present disclosure are limited thereto.

The guide panel 177 supports the liquid crystal panel 160 and is coupled to the rear cover 179. The guide panel 177 includes a panel support 177b supporting the liquid crystal panel 160 while preventing the cover bottom 171 from moving, and a panel side wall 177a covering the cover side wall 179b of the rear cover 179. The guide panel 177 includes a panel groove GH preventing the upper surface of the cover bottom 171 from moving or deviating, and the first hook GPH to be inserted into the first latching portion RH1.

The guide panel 177 constitutes an outer wall of a liquid crystal panel module assembly. Thus, for externalization of the liquid crystal panel module assembly, the guide panel 177 may have a shape in which the panel side wall 177a does not protrude so that the side surface sealant 163 attached to the liquid crystal panel 160 is exposed to the outside. The side surface sealant 163 may protect a side surface of the liquid crystal panel 160 from a shock, and thus, the panel side wall 177a does not need to have a height corresponding to the liquid crystal panel 160. Thus, it is enough to configure a side wall capable of forming the first hook GPH while being supported by the cover protruding surface 179c without protruding from the panel support 177b. In addition, the panel support 177b has only a recessed portion which is recessed low enough to prevent the foam pad 164 attached to the front surface from being deviated.

The panel groove GH is disposed at a rear surface of the panel support 177b of the guide panel 177. The panel groove GH is disposed at a portion corresponding to the upper surface of the cover bottom 171, e.g., corresponding to an upper surface of the bottom side wall 171b of the cover bottom 171. The first hook GPH protrudes inwardly from the panel side wall 177a to correspond to a position of a first latching portion RH1 provided in the cover side wall 179b. The first hook GPH includes a protruding portion (e.g., a laterally protruding portion) which protrudes not to be inclined from the panel side wall 177a, and an inclined portion which protrudes to be inclined from the panel side wall 177a. That is, the protruding portion is not inclined, but instead protrudes inwardly and forms a substantially flat surface, e.g., the upper surface of the first hook GPH, while the inclined portion protrudes at an incline from an inner side surface of the panel side wall 177a, as shown in FIG. 14. The protruding portion of the first hook GPH has a surface extending in a direction facing the panel support 177b (e.g., an upper surface of the protruding portion extends in a direction facing toward the top in the drawing), and the inclined portion thereof has a surface extending in a direction facing the cover base 179a (e.g., a direction toward the bottom in the drawing).

The protruding portion of the first hook GPH is flat in a horizontal direction like the upper side of the first latching portion RH1 of the rear cover 179, but the inclined portion of the first hook GPH has a slope of a predetermined angle unlike the lower side of the first latching portion RH1 of the rear cover 179. The first hook GPH provides a structure which alleviates difference in size and rigidity between the guide panel 177 and the rear cover 179 and even pressure and stress possibly occurring upon coupling of the guide panel 177 and the rear cover 179 due to such difference, and which supplements a coupling force between the guide panel 188 and the rear cover 179.

The protruding portion of the first hook GHP helps the guide panel 177 and the rear cover 179 coupling to each other to maintain a strong coupling force without being easily separated. That is, the protruding portion of the first hook GPH plays a role of preventing the rear cover 179 and the guide panel 177 from being easily separated in a direction (the direction toward the bottom in the drawing) opposite to a direction in which the rear cover 179 and the guide panel 177 are inserted to be coupled to each other. In addition, the first hook GPH provides a structure in which the first hook GPH is inserted into the first latching portion RH1 by slidably passing the cover side wall 179b when the guide panel 177 and the rear cover 179 are coupled to each other. In this process, in order to make the coupling easier, the upper part of the cover side wall 179b may have an outer side wall with a round-shaped edge to correspond to the position of the first hook GPH, but embodiments of the present disclosure are not limited thereto. The outer side wall is a wall of the cover side wall 179b which faces the panel side wall 177a of the guide panel 177.

Thus, the first hook GPH of the guide panel 177 and the first latching portion RH1 of the rear cover 179 provide an easier coupling structure in an assembling process to modulate the liquid crystal panel, and also helps the guide panel 177 and the rear cover 179 to maintain a strong coupling force while preventing the guide panel 177 and the rear cover 179 from being easily separated from each other. In addition, there is provided a coupling structure in which no space is formed between the guide panel 177 and the rear cover 179, thereby improving adhesion between the guide panel 177 and the rear cover 179. In addition, the guide panel 177 may help externalization with a structure in which the side surface sealant 163 attached to the liquid crystal panel 160 is exposed to the outside. As a result, even a space between a side surface of the liquid crystal panel 160 and the rear cover 179 is reduced, and therefore, a bezel may be reduced and exterior design may improve. In addition, as a coupling structure using a hook is provided, assembling efficiency may improve and a re-assembling error rate may be reduced.

As illustrated in FIG. 15, the rear cover 179, the cover bottom 171, the reflective sheet 172, the light guide plate 175, the lateral reflective sheet 173, the optical sheets 176, the guide panel 177, the foam pad 164, and the liquid crystal panel 160 are partially shown in the cross sectional view of the B3-B4 area.

The rear cover 179 accommodates the cover bottom 171. The rear cover 179 includes a cover base 179a supporting the bottom base 171a of the cover bottom 171, a cover side wall 179b acting as a side wall covering the bottom side wall 171*b* of the cover bottom 171, and a cover protruding surface 179*c* supporting the guide panel 177. The cover base 179*a* and the cover side wall 179*b* provide a space which accommodates the cover bottom 171 while preventing the same from moving. The cover side wall 179*b* has a second latching portion RH2 into which the second hook CBH of the cover bottom 171 is to be inserted. The second latching portion RH2 may have a shape of a groove recessed from the cover side wall 179*b* or a hole penetrating the cover side wall 179*b*. The upper part of the second latching portion RH2 is flat in a horizontal direction, but the lower part thereof is inclined. The second latching portion RH2 may be defined as a cover bottom hook latching portion.

In some embodiments of the present disclosure, the second hook CBH and the second latching portion RH2 may have a trapezoidal shape, as shown in FIG. 13. However, the shape is merely exemplary, and the second hook portion CBH and the second latching portion RH2 may have a quadrangular shape including a rectangular shape and a square shape, a trapezoidal shape, an elliptical shape, a circular shape, a polygonal shape, etc.

The cover bottom 171 accommodates the reflective sheet 172, the light guide plate 175, the lateral reflective sheet 173, and the optical sheets 176. The cover bottom 171 includes a board-type bottom base 171*a*, a bottom side wall 171*b* acting as a wall covering the board-type bottom base 171*a*, and the second hook CBH to be inserted into the second latching portion RH2 of the rear cover 179. The bottom base 171*a* and the bottom side wall 171*b* provide a space which accommodates the reflective sheet 172 while preventing the same from moving.

The second hook CBH includes a protruding portion (e.g., a laterally protruding portion) which protrudes not to be inclined from the bottom side wall 171*b*, and an inclined portion which protrudes to be inclined from the bottom side wall 171*b*. The protruding portion of the second hook CBH protrudes outwardly from the bottom side wall 171*b* and has a surface (e.g., an upper surface) that extends in a direction facing the panel support 177*b* (e.g., a direction toward the top in the drawing), and the inclined portion of the second hook CBH has a surface extending in direction facing the cover base 179*a* (e.g., a direction toward the bottom in the drawing).

The protruding portion of the second hook CBH is flat in a horizontal direction like the upper part of the second latching portion RH2 of the rear cover 179, but the inclined portion of the second hook CBH has a slope of a predetermined angle like the lower part of the second latching portion RH2 of the rear cover 179. The second hook CBH provides a structure which alleviates difference in size and rigidity between the guide panel 177 and the rear cover 179 and even pressure and stress possibly occurring upon coupling of the guide panel 177 and the rear cover 179 due to such difference, and which supplements a coupling force between the guide panel 188 and the rear cover 179. The protruding and inclined portions of the second hook CBH are different from the protruding and inclined portions of the first hook GPH in terms of protruding and inserted positions, but have similar or identical shapes to those of the protruding and inclined portions of the first hook GPH. That is, each of the second hook CBH and the first hook GPH has a portion which protrudes from a surface and which is inclined facing the cover base 179*a* of the rear cover 179.

The protruding portion of the second hook CBH helps the cover bottom 171 and the rear cover 179 being coupled thereto to maintain a strong coupling force without being easily separated. That is, the protruding portion of the second hook CBH plays a role of preventing the rear cover 179 and the cover bottom 171 from being easily separated in a direction (the direction toward the bottom in the drawing) opposite to a direction in which the rear cover 179 and the cover bottom 171 are inserted to be coupled to each other. In addition, the second hook CBH provides a structure in which the second hook CBH is inserted into the second latching portion RH2 by slidably passing the cover side wall 179*b* when the cover bottom 171 and the rear cover 179 are coupled to each other. In this process, in order to make the coupling easier, the upper part of the cover side wall 179*b* may have an inner side wall with a round-shaped edge to correspond to the position of the second hook CBH, but embodiments of the present disclosure are not limited thereto. The inner side wall is a wall of the cover side wall 179*b* of the rear cover 179 which faces the bottom side wall 171*b* of the cover bottom 171.

Thus, the second hook CBH of the cover bottom 171 and the second latching portion RH2 of the rear cover 179 provide an easier coupling structure in an assembling process to modulate the liquid crystal panel, and also helps the cover bottom 171 and the rear cover 179 to maintain a strong coupling force while preventing the cover bottom 171 and the rear cover 179 from being easily separated from each other. In addition, there is provided a coupling structure in which no space is formed between the cover bottom 171 and the rear cover 179, thereby improving adhesion between the cover bottom 171 and the rear cover 179. In addition, the guide panel 177 may help externalization with a structure in which the side surface sealant 163 attached to the liquid crystal panel 160 is exposed to the outside. As a result, even a space between a side surface of the liquid crystal panel 160 and the rear cover 179 is reduced, and therefore, a bezel may be reduced and exterior design may improve. In addition, as a coupling structure using a hook is provided, assembling efficiency may improve and a re-assembling error rate may be reduced.

Figure 16:
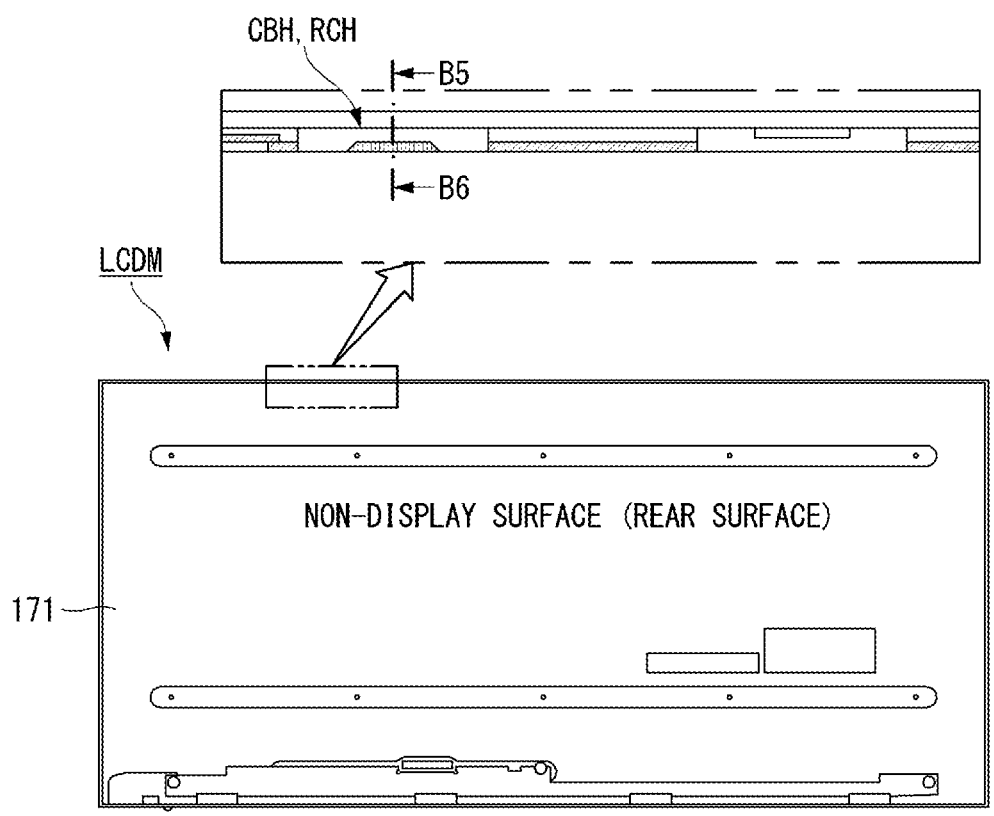
FIG. 16 is a diagram illustrating a rear surface of a liquid crystal panel assembly according to a third embodiment of the present disclosure.
Figure 17:
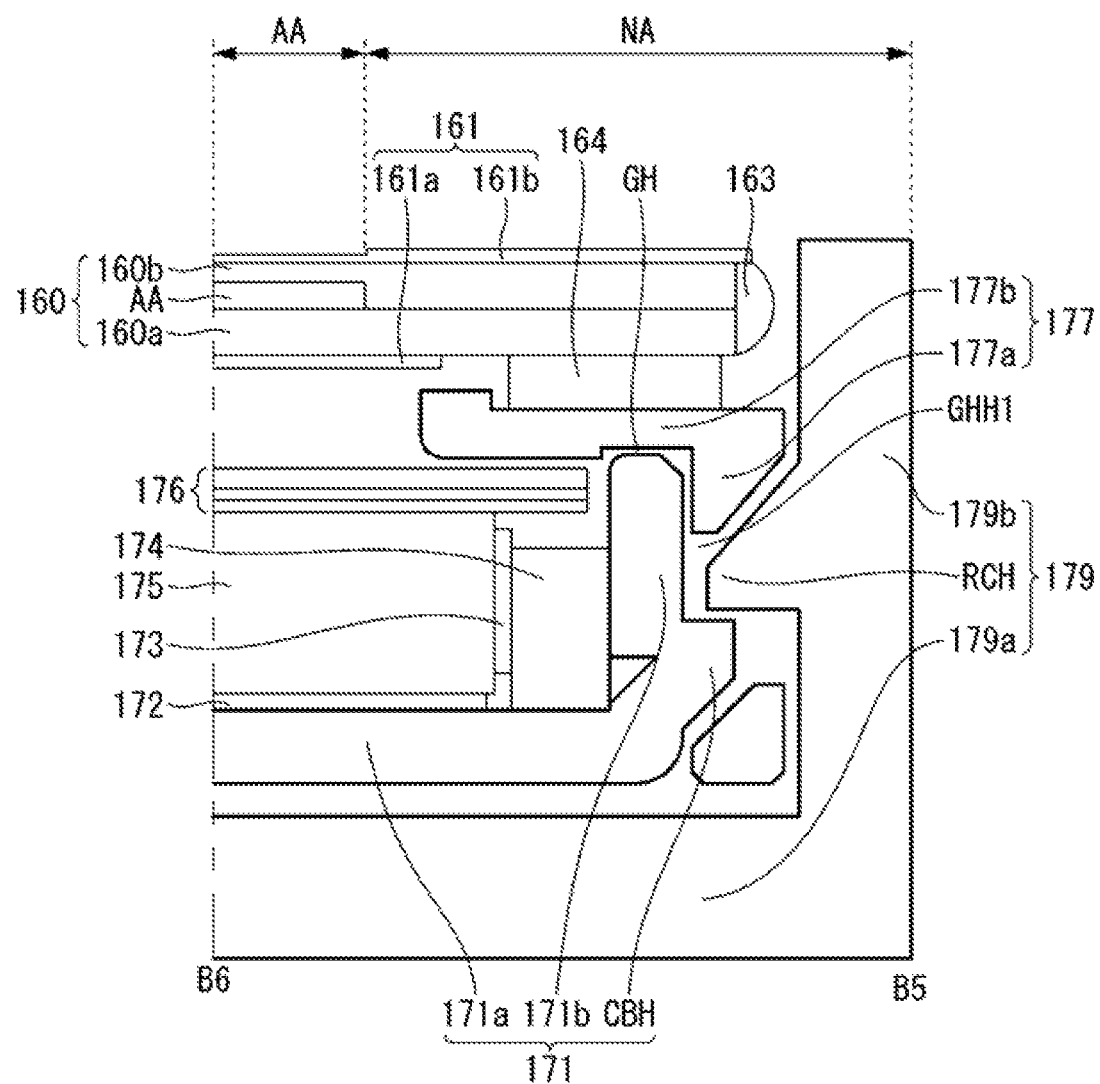
FIG. 17 is a cross sectional view of a B5-B6 area shown in FIG. 16.

FIG. 16 is a diagram illustrating a rear surface of a liquid crystal panel assembly according to a third embodiment of the present disclosure, and FIG. 17 is a cross sectional view of a B5-B6 area shown in FIG. 16.

As illustrated in FIG. 16, a liquid crystal panel module LCDM according to the third embodiment of the present disclosure includes a display surface (a front surface) in which an image is capable of being displayed. A rear surface of the liquid crystal panel module LCDM is covered by a board-type cover bottom 171.

As illustrated in the enlarged view of FIG. 16, the liquid crystal panel module LCDM includes hooks CBH and RCH for improving an assembly structure. The hooks CBH and RCH are disposed at the same location. The hooks CBH and RCH respectively protrude from surfaces so that the cover bottom 171 and a rear cover 179 are fitted into latching portions of a guide panel 177 to be coupled thereto.

The hook CBH disposed at a cross section of B5-B6 is defined as a second hook or a cover bottom hook which helps the cover bottom and the rear cover 179 to be coupled thereto. The hook RCH is defined as a fourth hook or a rear cover hook which helps the rear cover 179 and the cover bottom 171 to be coupled to thereto.

As illustrated in FIG. 17, the rear cover 179, the cover bottom 171, the reflective sheet 172, the light guide plate 175, the protective pad 174, the lateral reflective sheet 173, the optical sheets 176, the guide panel 177, the foam pad 164, and the liquid crystal panel 160 are partially shown in the cross section of the B5-B6 area.

The cover bottom 171 accommodates the reflective sheet 172, the light guide plate 175, the lateral reflective sheet 173, and the optical sheets 176. The cover bottom 171 includes a board-type bottom base 171a, a bottom side wall 171b acting as a wall covering the board-type bottom base 171a, and the second hook CBH to be inserted into a fourth latching portion GHH1 of the guide panel 177. The bottom base 171a and the bottom side wall 171b provide a space which accommodates the reflective sheet 172 while preventing the same from moving.

The rear cover 179 accommodates the cover bottom 171 and the guide panel 177. The rear cover 179 includes a cover base 179a supporting the bottom base 171a of the cover bottom 171, and a cover side wall 179b acting as a wall covering the panel side wall 177a of the guide panel 177. The cover side wall 179b of the rear cover 179 has a wall corresponding to a height of the front surface of the liquid crystal panel 160, unlike the first and second embodiments. The cover base 179a and the cover side wall 179b provide a space which accommodates the cover bottom 171 and the guide panel 177 while preventing the same from moving. The cover side wall 179b includes a fourth hook RCH to be inserted into the fourth latching portion GHH1 of the guide panel 177.

The liquid crystal panel 160 includes a lower substrate 160a and an upper substrate 160b coupled to each other with a display area AA therebetween. Polarizers 161 including a first polarizer 161a and a second polarizer 161b are attached to the front and rear surfaces of the liquid crystal panels 160. A side surface sealant 163 is attached to at least one surface of the liquid crystal panel 160.

The side surface sealant 163 protects a side surface of the liquid crystal panel 160. The side surface sealant 163 alleviates a shock occurring when a side surface of the liquid crystal panel 160 collides with a side surface of the guide panel 177. That is, the side surface sealant 163 prevents a damage caused by an external shock to the liquid crystal module LCDM.

The liquid crystal panel 160 is attached to the panel supporting surface 177b of the guide panel 177 by the foam pad 164 which is disposed at a non-display area NA. The foam pad 164 may be formed of an elastic material, and may be in a structure in which an adhesive or a tape is attached to both surfaces of the foam pad 164.

The foam pad 164 may have a shape of a closed-curve frame (edge) corresponding to four surfaces of the liquid crystal panel 160. The foam pad 164 allows the liquid crystal panel 160 to be attached and fixed to the panel support 177b of the guide panel 177, and prevents a foreign substance from coming inside. In addition, the foam pad 164 may include a black material in order to prevent light leakage which is a leakage of light entering through the light guide plate 175 to the outside, but embodiments of the present disclosure are limited thereto.

The guide panel 177 is accommodated by the rear cover 179, and has a shape in which the panel side wall 177a does not protrude so that the side surface sealant 163 attached to the liquid crystal panel 160 is not exposed to the outside. Thus, it is enough to configure the panel side wall 177a just as a side wall that forms the fourth latching portion GHH1 without protruding from the panel support 177b. In addition, the panel support 177b has a protruding portion that protrudes from an inner end of the panel support 177b to have a height which is low enough not to cause the foam pad 164 attached to the front surface to move inside. The panel groove GH is positioned on the rear surface of the panel support 177b of the guide panel 177. The panel groove GH is positioned at a portion corresponding to the top surface of the cover bottom 171.

The guide panel 177 supports the liquid display panel 160, and provides a space in which the cover bottom 171 and the rear cover 179 are coupled thereto. The guide panel 177 includes: a panel support 177b which supports the liquid crystal panel 160 while preventing the cover bottom 171 from moving; and a panel side wall 177a which surrounds the bottom side wall 171b of the cover bottom 171. The guide panel 177 includes: a panel groove GH which prevents an upper surface of the cover bottom 171 from moving or being deviated; and a fourth latching portion GHH1 in which the second hook CBH of the cover bottom 171 and the fourth hook RCH of the rear cover 179 are coupled to each other upon insertion. The fourth latching portion GHH1 may have a hole shape penetrating the panel side wall 177a. The fourth latching portion GHH1 may be defined as a hook latching portion of the cover bottom 171 and the rear cover 179.

In some embodiments of the present disclosure, each of the second hook CBH, the fourth hook RCH, and the fourth latching portion GHH1 may be formed in a trapezoidal shape, as shown in FIG. 17. However, this is merely exemplary, and each of the second hook CBH, the fourth hook RCH, and the fourth latching portion GHH1 may be a quadrangular shape including a rectangular shape and a square shape, an elliptical shape, a circular shape, a polygonal shape, etc.

The second hook CBH includes a protruding portion (e.g., a laterally protruding portion) which protrudes not to be inclined from the bottom side wall 171b, and an inclined portion which protrudes to be inclined from the bottom side wall 171b. The protruding portion of the second hook CBH outwardly from the bottom side wall 171b and has a surface (e.g., an upper surface) that extends in a direction facing the panel support 177b (e.g., a direction toward the top in the drawing), and the inclined portion of the second hook CBH has a surface extending in a direction facing the cover base 179a (e.g., a direction toward the bottom in the drawing). The protruding portion of the second hook CBH is flat in a horizontal direction, and the inclined portion of the second hook CBH has a slope of a predetermined angle like the lower part of the fourth latching portion GHH1 of the guide panel 177. The second hook CBH is coupled to the fourth hook RCH of the rear cover in the fourth latching portion GHH1 of the guide panel 177. The second hook CBH provides a structure which alleviates difference in size and rigidity between the cover bottom 171 and the guide panel 177 and even pressure and stress possibly occurring upon coupling of the cover bottom 171 and the guide panel 177 due to such difference, and which supplements a coupling force between the cover bottom 171 and the guide panel 177.

The fourth hook RCH of the rear cover 179 protrudes inwardly from the cover side wall 179b to correspond to the position of the fourth latching portion GHH1 of the guide panel 177. The fourth hook RCH of the rear cover 179 is depicted as protruding at a position higher than a position of the second hook CBH of the cover bottom 171, but their position relationship may be opposite in various embodiments according to an assembling method.

The fourth hook RCH includes an inclined portion which protrudes at an incline from an inner surface of the cover side wall 179b, and a protruding portion which protrudes not to be inclined from the cover side wall 179b. The inclined portion of the fourth hook RCH has a surface extending in direction facing the panel support 177b (e.g., a direction toward the top in the drawing), and the protruding portion of the fourth hook RCH has a surface extending in a direction facing the cover base 179a, that is, a direction opposite to that of the inclined portion (e.g., a direction toward the bottom in the drawing), or a direction facing the protruding portion of the second hook CBH of the cover bottom 171. The inclined portion of the fourth hook RCH has a slope of a predetermined angle like the upper part of the fourth latching portion GHH1 of the guide panel 177, and the protruding portion of the fourth hook RCH is flat in a horizontal direction. The fourth hook RCH is coupled to the second hook CBH to thereby help the cover bottom 171, the guide panel 177, and the rear cover 179 to be coupled to each other.

Thus, the second hook CBH of the cover bottom 171 and the fourth hook RCH of the rear cover 179 provides an easier coupling structure in an assembling process to modulate the liquid crystal panel, and helps the cover bottom 171, the guide panel 177, and the rear cover 179 to maintain a strong coupling force while preventing the cover bottom 171, the guide panel 177, and the rear cover 179 from being easily separated from each other. In addition, there is provided a coupling structure in which no space is formed between the cover bottom 171, the guide panel 177, and the rear cover 179, thereby improving adhesion therebetween. In addition, the guide panel 177 may help externalization with a structure in which the side surface sealant 163 attached to the liquid crystal panel 160 is exposed to the outside. As a result, even a space between a side surface of the liquid crystal panel 160 and the rear cover 179 is reduced, and therefore, a bezel may be reduced and exterior design may improve. In addition, as a coupling structure using a hook is provided, assembling efficiency may improve and a re-assembling error rate may be reduced.

The present disclosure provides an easier coupling structure in an assembling process to modulate the liquid crystal panel, and also helps components to maintain a strong coupling force while preventing the components from being easily separated from each other. In addition, the present disclosure provides a coupling structure in which no space is formed between mechanisms, thereby improving adhesion therebetween. As a result, even a space between a side surface of the liquid crystal panel and the rear cover is reduced, and therefore, a bezel may be reduced and exterior design may improve. In addition, the present disclosure provides a coupling structure using hooks, and assembling efficiency may be improved and a re-assembling error rate may be reduced.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A liquid crystal display device comprising:
a liquid crystal panel configured to display an image;
a cover bottom accommodating a light source configured to provide light to the liquid crystal panel, the cover bottom having a bottom side wall;
a rear cover accommodating the cover bottom, the rear cover having a cover side wall; and
a guide panel on the cover bottom to support the liquid crystal panel, the cover side wall of the rear cover disposed between the guide panel and the bottom side wall of the cover bottom,
wherein the guide panel and the cover bottom include hooks that protrude from respective surfaces of the guide panel and the cover bottom, the hooks being fitted into corresponding latching portions of the cover side wall of the rear cover to couple the guide panel and the cover bottom to the rear cover.

2. The liquid crystal display device of claim 1, wherein the guide panel comprises a first hook to be inserted into a first latching portion of the rear cover, and the cover bottom comprises a second hook to be inserted into a second latching portion of the rear cover.

3. The liquid crystal display device of claim 2, wherein each of the first hook and the second hook has an inclined surface facing a cover base of the rear cover.

4. The liquid crystal display device of claim 2, wherein the first hook protrudes from a panel side wall of the guide panel, and includes a protruding portion that protrudes laterally inward from the panel side wall, and an inclined portion which protrudes inwardly at an incline from the panel side wall.

5. The liquid crystal display device of claim 4,
wherein the rear cover comprises a cover base supporting a bottom base of the cover bottom, and the cover side wall covers the bottom side wall of the cover bottom, and
wherein an upper part of the cover side wall has an outer side wall with an inclined edge to correspond to a position of the first hook.

6. The liquid crystal display device of claim 2, wherein the second hook protrudes from the bottom side wall of the cover bottom, and includes a protruding portion which protrudes laterally outward from the bottom side wall, and an inclined portion which protrudes outwardly at an incline from the bottom side wall.

7. The liquid crystal display device of claim 6,
wherein the rear cover comprises a cover base supporting a bottom base of the cover bottom, and the cover side wall covers the bottom side wall of the cover bottom, and
wherein an upper part of the cover side wall has an inner side wall with an inclined edge to correspond to a position of the second hook.

8. The liquid crystal display device of claim 7, wherein the cover bottom comprises a third hook to be inserted into a third latching portion of the rear cover.

9. The liquid crystal display device of claim 8, wherein the third hook protrudes from a bottom side wall of the cover bottom, and includes a protruding portion which protrudes laterally outward from the bottom side wall, and an inclined portion which protrudes outwardly at an incline from the bottom side wall, the protruding portion being between the cover base and the inclined portion.

10. The liquid crystal display device of claim 9, wherein the inclined portion of the third hook faces a panel support of the guide panel.

11. A liquid crystal display device comprising:
a liquid crystal panel configured to display an image;
a cover bottom accommodating a light source configured to provide light to the liquid crystal panel;
a guide panel on the cover bottom to support the liquid crystal panel; and
a rear cover accommodating the cover bottom, wherein the cover bottom comprises a cover bottom hook which protrudes from a surface of the cover bottom and is fitted to an adjacent latching portion of one of the rear cover or the guide panel, and wherein the cover bottom hook protrudes from a bottom side wall of the cover bottom, and includes a protruding portion which protrudes laterally outward from the bottom side wall, and an inclined portion which protrudes outwardly at an incline from the bottom side wall, and wherein the inclined portion of the cover bottom hook faces a cover base of the rear cover.

12. The liquid crystal display device of claim 11, wherein the guide panel includes a hook latching portion into which the cover bottom hook is inserted.

13. The liquid crystal display device of claim 12, wherein the rear cover includes a rear cover hook that protrudes from a cover side wall of the rear cover, and the rear cover hook is inserted in the hook latching portion of the guide panel.

14. The liquid crystal display device of claim 13 wherein the cover bottom hook protrudes outwardly from the bottom side wall of the cover bottom toward the cover side wall of the rear cover, and the rear cover hook protrudes inwardly from the cover side wall of the rear cover toward the bottom side wall of the cover bottom.

15. The liquid crystal display device of claim 14 wherein the cover bottom hook is positioned between the cover base of the rear cover and the rear cover hook.

16. The liquid crystal display device of claim 13,
wherein the rear cover hook includes a protruding portion which protrudes laterally inward from the cover side wall, and an inclined portion which protrudes inwardly at an incline from the cover side wall, and wherein the inclined portion of the rear cover hook faces a panel support of the guide panel.

17. The liquid crystal display device of claim 16, wherein the cover bottom hook and the rear cover hook are inserted into the hook latching portion to be coupled to each other.

18. The liquid crystal display device of claim 11, wherein the rear cover includes cover side wall having a hook latching portion into which the cover bottom hook is inserted, and the guide panel includes a panel side wall covering an outer side of the cover side wall of the rear cover.

19. The liquid crystal display device of claim 18, wherein the panel side wall of the guide panel includes a guide panel hook which protrudes inwardly from a side surface of the panel side wall and is inserted into a second hook latching portion of the cover side wall of the rear cover.

20. A liquid crystal display device comprising:
a liquid crystal panel configured to display an image;
a cover bottom accommodating a light source configured to provide light to the liquid crystal panel;
a rear cover accommodating the cover bottom; and
a guide panel on the cover bottom to support the liquid crystal panel,
wherein the guide panel and the cover bottom include hooks that protrude from respective surfaces of the guide panel and the cover bottom, the hooks being fitted into corresponding latching portions of the rear cover to couple the guide panel and the cover bottom to the rear cover,
wherein the guide panel comprises a first hook to be inserted into a first latching portion of the rear cover, and the cover bottom comprises a second hook to be inserted into a second latching portion of the rear cover, and
wherein the second hook protrudes from a bottom side wall of the cover bottom, and includes a protruding portion which protrudes laterally outward from the bottom side wall, and an inclined portion which protrudes outwardly at an incline from the bottom side wall.

\* \* \* \* \*